US012483701B2

(12) United States Patent
Guruva reddiar et al.

(10) Patent No.: US 12,483,701 B2
(45) Date of Patent: Nov. 25, 2025

(54) METHODS AND APPARATUS TO PROCESS VIDEO FRAME PIXEL DATA USING ARTIFICIAL INTELLIGENCE VIDEO FRAME SEGMENTATION

(71) Applicant: Intel Corporation, Santa Clara, CA (US)

(72) Inventors: Palanivel Guruva reddiar, Chandler, AZ (US); Jill Boyce, Portland, OR (US); Praveen Nair, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 17/555,119

(22) Filed: Dec. 17, 2021

(65) Prior Publication Data

US 2022/0109838 A1 Apr. 7, 2022

(51) Int. Cl.
*H04N 19/119* (2014.01)
*G06T 7/194* (2017.01)
(Continued)

(52) U.S. Cl.
CPC ............ *H04N 19/119* (2014.11); *G06T 7/194* (2017.01); *H04N 19/70* (2014.11); *G06T 2207/10016* (2013.01); *H04L 65/403* (2013.01)

(58) Field of Classification Search
CPC ...... H04N 19/119; H04N 19/70; G06T 7/194; G06T 2207/10016; H04L 65/403
See application file for complete search history.

(56) References Cited

U.S. PATENT DOCUMENTS

2003/0095598 A1  5/2003  Lee et al.
2005/0237380 A1  10/2005  Kakii et al.
(Continued)

FOREIGN PATENT DOCUMENTS

| CN | 112954398 A | * | 6/2021 | ......... H04N 21/2343 |
| CN | 113411537 A | * | 9/2021 | |
| WO | 2021248349 A1 | | 12/2021 | |

OTHER PUBLICATIONS

Boyce, "Object tracking SEI message (now Annotated region SEI message)," Joint Collaborative Team on Video Coding 31st meeting: San Diego, US, dated Apr. 13-20, 2018, 8 pages.
(Continued)

*Primary Examiner* — Dave Czekaj
*Assistant Examiner* — Shanika M Brumfield
(74) *Attorney, Agent, or Firm* — Hanley, Flight & Zimmerman, LLC

(57) ABSTRACT

Disclosed examples include video frame segmenter circuitry to generate segmentation data of first video frame pixel data, the segmentation data including metadata corresponding to a foreground region and a background region, the foreground region corresponding to the first video frame pixel data. The disclosed examples also include video encoder circuitry to generate a first foreground bounding region and a first background bounding region based on the segmentation data, determine a first virtual tile of the first video frame pixel data, the first virtual tile located in the first foreground bounding region, encode the first virtual tile into a video data bitstream without encoding the first background bounding region, and transmit the video data bitstream via a network.

20 Claims, 13 Drawing Sheets

(51) Int. Cl.
*H04N 19/70* (2014.01)
*H04L 65/403* (2022.01)

(56) References Cited

U.S. PATENT DOCUMENTS

| | | | |
|---|---|---|---|
| 2007/0009028 A1 | 1/2007 | Lee et al. | |
| 2010/0119147 A1 | 5/2010 | Blake et al. | |
| 2015/0036931 A1* | 2/2015 | Loui | G06F 16/5854 |
| | | | 382/195 |
| 2015/0172627 A1* | 6/2015 | Lee | H04N 13/106 |
| | | | 348/44 |
| 2019/0355172 A1* | 11/2019 | Dsouza | G06F 3/017 |
| 2022/0116552 A1* | 4/2022 | Benjamin | H04L 65/1089 |

OTHER PUBLICATIONS

European Patent Office, "Extended European Search Report," issued in connection with European Patent Application No. 22207615.0, dated Mar. 22, 2023, 10 pages.

Dror et al., "Content adaptive video compression for autonomous vehicle remote driving," Applications of Digital Image Processing XLIV, vol. 11842, dated Aug. 1, 2021, 11 pages.

* cited by examiner

METHODS AND APPARATUS TO PROCESS VIDEO FRAME PIXEL DATA USING ARTIFICIAL INTELLIGENCE VIDEO FRAME SEGMENTATION

FIELD OF THE DISCLOSURE

This disclosure relates generally to computers and, more particularly, to methods and apparatus to process video frame pixel data using artificial intelligence video frame segmentation.

BACKGROUND

An electronic user device such as a laptop or a mobile device includes a camera to capture images. The camera can be used during a video call in which images of the user of the device are transmitted to other user devices.

Figure 1:
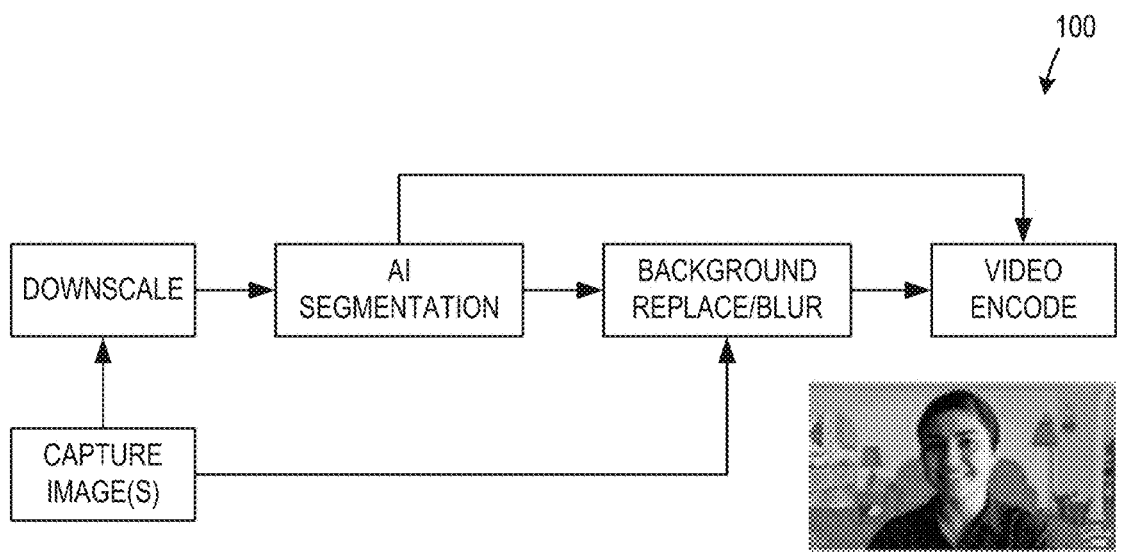
FIG. 1 is a process flow diagram showing a prior process to segment and encode video frames during video conferencing.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In an electronic user device such as a laptop, tablet, or smartphone that includes a camera, the user device may include user applications such as a video conferencing application. During, for instance, a video conference, the camera (e.g., a built-in video camera, a separate camera that is an accessory to the input device, etc.) of the user device generates images of the user. The user device encodes and transmits the images via network communication to one or more other user devices operating as video conferencing devices (e.g., laptops, tablets, smartphones, etc.) participating in the video conference. Each of the one or more video conferencing devices also includes a camera. During the video conference, the cameras of the one or more video conferencing devices generate images of respective users of the video conferencing devices. The one or more video conferencing devices encode and transmit the images via network communications to the user device. The user device decodes and displays the images received from the other video conferencing device(s) on a display screen of the user device.

Encoding an image generated by a camera of a user device can use a large amount of processing power of the user device. In some examples, a significant portion of the processing power is related to memory bandwidth usage which employs power-consuming memory resources such as double data rate input/output (DDRIO) and memory controller power. For example, in prior video conferencing encoding pipelines, an entire video frame (e.g., a 1920 by 1080 pixel resolution image) may be read from and/or written to the memory (e.g., dynamic random access memory, static random access memory, etc.) several (e.g., seven or more) times. In some examples, video conferencing applications use a high frame rate (e.g., 60 frames per second). In some examples, a video encoder uses standards-compliant coding schemes or techniques (e.g., Advanced Video Coding (AVC), High Efficiency Video Coding (HEVC), etc.) that can facilitate motion compensation and/or motion estimation techniques to efficiently compress video data. Motion estimation is a technique of detecting movement patterns corresponding to objects (e.g., users of the video conferencing application) and/or the camera (e.g., static, or dynamic background) in the video frame(s) of the video sequence. Motion compensation can be implemented using an algorithm that predicts the motion of object(s) and/or camera movements based on partially-processed frames (e.g., previous and/or bi-directional frames) as well one or more fully-processed frames (e.g., reference frames). When using example standards-compliant schemes with only one reference frame to process a video conference stream, the video conferencing application can use a significant amount of memory bandwidth (e.g., 90 Megabytes per second (MBps)) for processing (e.g., encoding) video frame data generated at 30 frames per second. Example Equation 1 below can be used to calculate the amount of example memory bandwidth that the video conferencing application uses to process/encode the video conference stream.

$$\text{Memory Bandwidth} = 1920 * 1080 * 1.5 * 30 \quad \text{(Eq. 1)}$$
$$= 93{,}312{,}000 \text{ bytes}$$

In example Equation 1 above, 1920 and 1080 are the width and height of pixels in the frame, 1.5 is a constant value referring to a YUV color space with 4:2:0 chroma subsampling, and 30 is the number frames generated per second.

Additionally, decoding the images received from the video conferencing devices at the user device can use a large amount of processing power related to memory bandwidth. For example, in known video conferencing decoding and displaying pipelines, an entire video frame (e.g., a 1920 by 1080 pixel resolution image) may be read from and/or written to the memory (e.g., dynamic random access memory, static random access memory, etc.) several (e.g., four or more) times. In some examples, a video conference can include a plurality (e.g., 16) of participants such that the user device receives images from a plurality of (e.g., 15) video conferencing devices. Therefore, the number of reads from and/or writes to the memory for entire video frames is multiplied by the number of additional participants (e.g., the number of video conferencing devices). Additionally, with the high frame rate (e.g., 30 frames per second) used for video conferencing and with the standards-compliant (e.g., AVC, HEVC, etc.) motion compensation techniques used for decoding, the video conferencing application can use a significant amount of memory bandwidth (e.g., 1.5 Gigabytes per second (GBps)) for processing (e.g., decoding), downscaling, signaling, and/or displaying the decoded video frames for 16 participants in the video conferencing session. Example Equation 2 below can be used to calculate the amount of example memory bandwidth that the video conferencing application uses to process/decode the video conference stream(s).

$$\text{Memory Bandwidth} = 1920 * 1080 * 1.5 * 30 * 16 \quad \text{(Eq. 2)}$$
$$= 1{,}492{,}992{,}000 \text{ bytes}$$

In example Equation 2 above, 1920 and 1080 are the width and height of pixels in the frame, 1.5 is a constant value referring to a YUV color space with 4:2:0 chroma subsampling, 30 is the number frames generated per second, and 16 is the number of video streams decoded for display in the video conferencing session.

In some examples, a foreground portion of the image generated by the camera of the user device, or the camera(s) of the video conferencing devices(s), includes relevant information such as a depiction of the user. In some examples, a background portion of the image includes less relevant information behind the user of the image that is substantially unchanged from a previous frame (e.g., a room, wall, etc.). In some examples, the foreground portion of the image is a rectangular region of pixels in the video frame that includes the user and some background portions. In some examples, the rectangular foreground region and one or more rectangular background regions inside and outside the foreground region are detected by an artificial neural network (ANN). The example ANN can also be trained or programmed to generate metadata of the detected pixels in the foreground region(s) and background region(s) that can be used by the example video encoder circuitry to segment the video frame in to foreground bounding region(s) and background bounding region(s). In some examples, video encoder circuitry of the user device or of the video conferencing device(s) determines a virtual tile of the video frame image data that includes portions of the foreground bounding region(s) that do not overlap with the background bounding region(s). Thus, the example video encoder circuitry can determine pixel data of the video frame that mostly include the user of the video conference based on segmentation data received from the artificial neural network.

Examples disclosed herein omit reading and/or writing of the background portions of the image from and/or to memory to reduce processing time, memory bandwidth usage, and power consumption during video conferencing. Examples disclosed herein include video encoder circuitry to process (e.g., encode) the virtual tile of the video frame image captured by the camera of the user device to reduce memory bandwidth during video conferencing. Additionally, examples disclosed herein include video decoder circuitry to process (e.g., decode) the virtual tile from a data bitstream received from other user devices during video conferencing to reduce memory bandwidth.

FIG. 1 illustrates an example process 100 for encoding video frames during video conferencing using prior techniques for segmenting and encoding video frames of a video sequence. In FIG. 1, one or more cameras captures video frames and send(s) video frame pixel data to both a video encoder and a down-scaler. The down-scaler sub-samples the video frame(s), and an artificial intelligence-based segmentation scheme processes the video frame(s) to identify the foreground and background region(s) of the video frame(s). The identified background region(s) of the video frame(s) are replaced by a virtual background and/or are blurred out. A video encoder encodes the modified video frame(s) using a standard video compression codec (e.g., H.264 Advanced Video Coding (AVC), H.265 High Efficiency Video Coding (HEVC), etc.) and motion estimation. The video encoder divides the frame into multiple blocks (e.g., macroblocks, coding tree units, etc.) and a block matching algorithm can be used to compare macroblocks of a current video frame with a corresponding block and the adjacent macroblocks in a nearby (e.g., previous) video frame in the video sequence. A motion vector is also created that models the movement of the macroblock from one location to another. For intra-frame data (i.e., reference frame data), the video encoder encodes some of (e.g., all of and/or a portion of) the blocks in the frame using the block matching algorithm to combine, compress, consolidate, etc. adjacent blocks with similar spatial information. In some examples, there are no motion vectors for the intra-frame data, and spatial information is instead used to effectively compress the information. For inter-frame data (i.e., predictive frame data), the blocks that have significantly changed are encoded and the pixel data that remain unchanged from the nearby frames are not encoded. In some examples, the video encoder computes macro-block movement(s) and signals the macro-block movement(s) as motion vector(s). Performing compression techniques, such as motion estimation and block matching, for the whole video frame could involve, for example, 32,400 blocks of 8×8 size on a 1920×1080 pixel frame. Running processes on this many blocks for the video frames in a video sequence can be intensive for the processor. Moving the processing to a cloud computing configuration would add latency to the video conference which would reduce the quality of the video conference, resulting in a poor user experience. Processing (e.g., encoding) this many blocks per frame creates a significant amount of traffic between the video encoder and memory, thereby restricting the memory bandwidth of the computing system.

Figure 2:
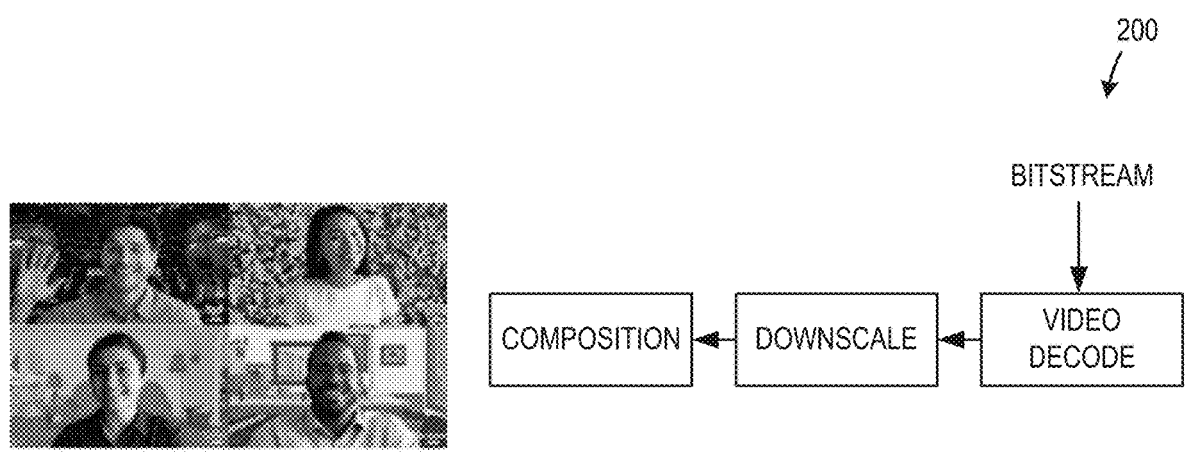
FIG. 2 is a flow diagram showing a prior process to decode and display video frames during video conferencing.

FIG. 2 illustrates an example process 200 for decoding video frames during video conferencing using prior techniques for decoding and displaying video frames of a video sequence. In FIG. 2, a video decoder receives a bitstream of data sent by a video encoder device via a network. The bitstream is decoded over time into video frames of a video sequence with a standard video codec (e.g., H.264 Advanced Video Coding (AVC), H.265 High Efficiency Video Coding (HEVC), etc.) and motion estimation processes. The decoded video frames in the video sequence are downscaled and composed into a grid (e.g., 2×2 frames) to fit a display screen of a user device used to implement a video conferencing application. Like the video encoder of FIG. 1, the video decoder performs processing (e.g., decoding) operations for the full-frame pixel data of the encoded intra-frame data and the inter-frame data. The video decoder decodes bitstream data that includes the encoded full video frame pixel data (e.g., intra-frame data) or the encoded blocks (e.g., macroblocks, coding tree units, etc.) of pixel data the video decoder uses for motion estimation and/or block matching. Decoding the intra-frame data and inter-frame data using these systems, apparatus, and methods is a compute-intensive task and consumes a significant amount of memory bandwidth from repeated reads from and writes to memory.

Figure 3:
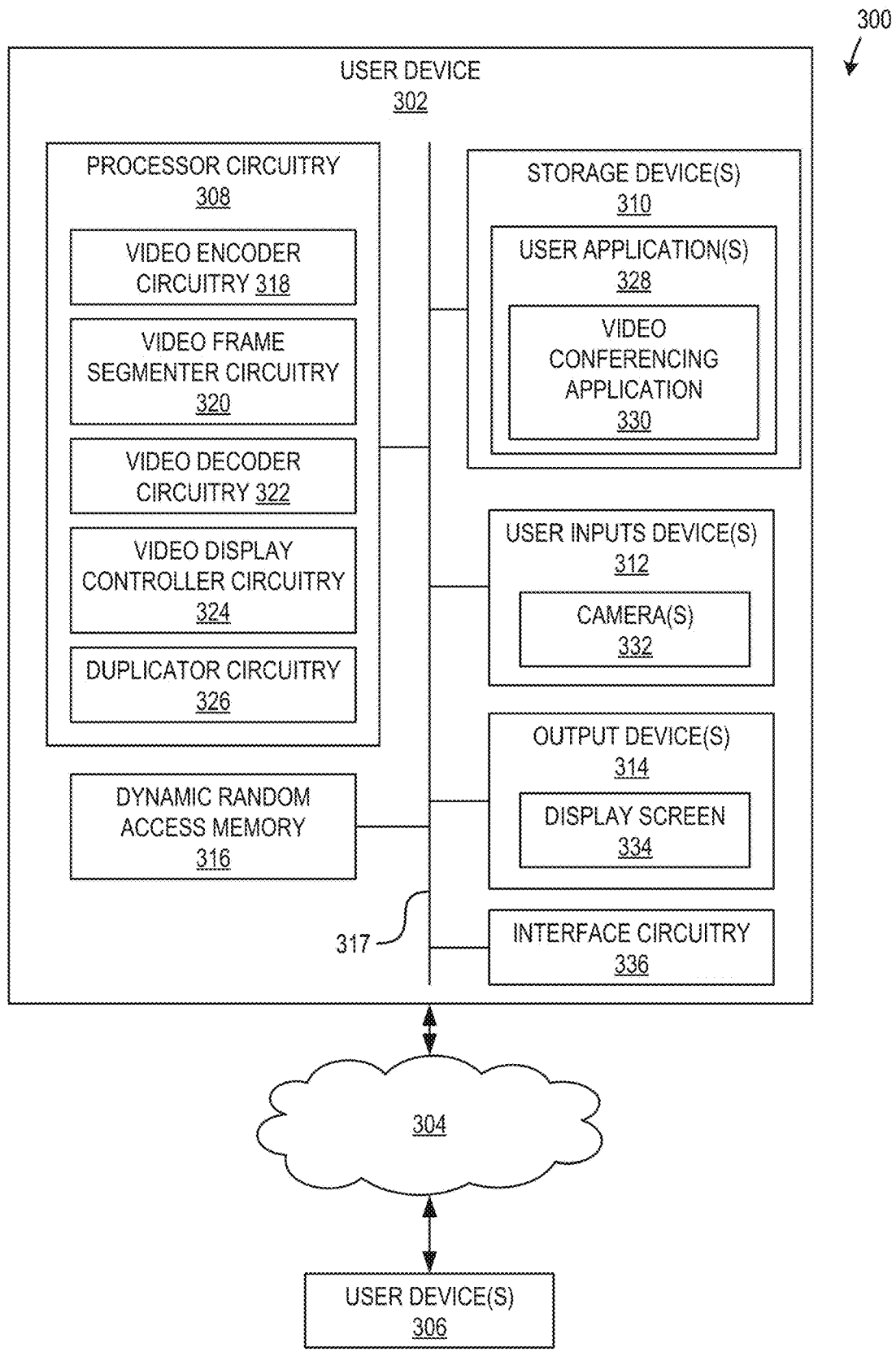
FIG. 3 illustrates an example user device structured to communicate in end-to-end video conferencing using artificial intelligence video frame segmentation in accordance with teachings of this disclosure.

FIG. 3 is a block diagram of an example system 300 constructed in accordance with teachings of this disclosure. In example FIG. 3, the system 300 includes a user device 302 in communication with one or more other user device(s) 306 via a network 304 to process (e.g., encode and decode) video frame pixel data using artificial intelligence video frame segmentation during video conferencing. The example user device 302 and/or the example user device(s) 306 of FIG. 3 may be instantiated (e.g., creating an instance of, bring into being for any length of time, materialize, implement, etc.) by processor circuitry 308 such as a central processing unit executing instructions. Additionally or alternatively, the example user device 302 and/or the example user device(s) 306 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example system 300 illustrated in FIG. 3 includes the example user device 302 constructed in accordance with teachings of this disclosure for processing (e.g., encoding and/or decoding) video images in a video sequence associated with a video conference. The example user device 302 can be a personal computing device such as a laptop, a desktop computer, an electronic tablet, a smartphone, etc. The example system 300 illustrated in FIG. 3 shows details of the example user device 302 that can be substantially similar or identical to the user device(s) 306. Although one example user device 306 is illustrated in FIG. 3, a plurality of remote and/or local user devices 306 can be connected to the user device 302 via the network 304.

The example user device 302 of FIG. 3 includes processor circuitry 308. The processor circuitry 308 of the example user device 302 is a semiconductor-based hardware logic device. The hardware processor circuitry 308 may implement a central processor unit (CPU) of the local user device 302, may include any number of cores, and may be implemented, for example, by a processor commercially available from Intel® Corporation. The example user device 302 includes one or more storage devices 310, such as non-volatile memory (e.g., flash memory). The example user device 302 includes user input device(s) 312, user output device(s) 314, and example dynamic random access memory (DRAM) 316. Although user device 302 includes the DRAM 316, this type of random access memory can be substituted and/or complemented by other types of volatile memory (e.g., static random access memory). The example user device 302 also includes a bus 317 to communicatively couple the components of the user device 302.

The example processor circuitry 308 of user device 302 instantiates and/or executes example circuitry including, for example, video encoder circuitry 318, video frame segmenter circuitry 320, video decoder circuitry 322, video display controller circuitry 324, and duplicator circuitry 326. The example processor circuitry 308 also executes example machine readable instructions (e.g., software) including, for example, user application(s) 328 such as a video conferencing application 330 installed on the user device 302. The example user application(s) 328 are stored in the storage device(s) 310. The example user input device(s) 312 of the user device 302 includes one or more camera(s) 332 to generate video images of the user and surrounding areas during video conference(s).

The example output device(s) 314 of the user device 302 includes a display screen 334. In some examples, the display screen 334 includes a touch panel that enables a user to interact with data presented on the display screen 334 by touching the display screen 334 with a stylus and/or one or more fingers or a hand of the user. Additionally or alternatively, the user can interact with data presented on the display screen 334 via user input device(s) 312 such as camera(s) 332, a keyboard, a mouse, a touch pad, etc.

The example user device 302 includes interface circuitry 336 to send (e.g., transmit) and/or receive data (e.g., video bitstream data) to other systems and/or devices (e.g., user device(s) 306) via the network 304. The example interface circuitry 336 can use internet protocols (e.g., voice over internet protocols, video conferencing protocols, etc.) to communicate with other devices (e.g., user device(s) 306) to facilitate video conferencing session(s). In some examples, the interface circuitry 336 synchronizes incoming and outgoing data such that example video frame(s) encoded into example bitstream data are processed in the correct order.

The example processor circuitry 308 of the user device 302 illustrated in FIG. 3 includes example video encoder circuitry 318. During, for example, a video conference, the video encoder circuitry 318 can process (e.g., perform image processing, encode, etc.) generated video frame image data and transmit an encoded bitstream via the network 304 to the user device(s) 306. The example video encoder circuitry 318 can determine foreground bounding region(s) and background bounding region(s) of the video frame pixel data based on segmentation data generated by example video frame segmenter circuitry 320. The example video encoder circuitry 318 can also determine a virtual tile based on the foreground and background bounding region(s). In examples disclosed herein, the virtual tile(s) refer to pixel data region(s) of the video frame that are included in the foreground bounding region(s) but not in the background bounding region(s). The example video encoder circuitry 318 can process (e.g., video encode) the virtual tile(s), write annotated regions supplemental enhancement information (ARSEI) messages based on the foreground bounding region(s) and background bounding region(s), encode the virtual tile(s) into data bitstream(s), and transmit the bitstream(s) via the network 304 to one or more user devices 306.

The example processor circuitry 308 of the user device 302 illustrated in FIG. 3 includes the video frame segmenter circuitry 320. In some examples, the video frame segmenter circuitry 320 can receive video frame pixel data from the camera(s) 332 and downscale an image to process fewer pixels than it would for the full-resolution image. In some examples, the video frame segmenter circuitry 320 is an artificial neural network trained to segment the pixel data into segmentation masks based on foreground detection model(s) and background detection model(s). The example video frame segmenter circuitry 320 can generate segmentation data indicating pixel data located in the foreground region(s) and the background region(s) of the video frame.

The example processor circuitry 308 of the user device 302 illustrated in FIG. 3 includes video decoder circuitry 322. In some examples, the video decoder circuitry 322 receives bitstream data and annotated regions supplemental enhancement information (ARSEI) messages from one or more user device(s) 306. The example video decoder circuitry 322 can use video coding standards (e.g., AVC, HEVC, etc.) to decode the bitstream into video frame pixel data. In some examples, the image data decoded includes the encoded virtual tile and/or an encoded full-frame video image. The example video decoder circuitry 322 can read the ARSEI messages and use the ARSEI messages to determine which pixel data are associated with the foreground region(s) and background region(s), what pixel data are included in the virtual tile(s), and/or where the virtual tile(s) are to be placed (e.g., relative to the top-left corner of the frame) and/or) in the video frame. In some examples, the video decoder circuitry 322 stores bitstream data in DRAM 316 to fetch at a later time (e.g., 1 second after storing) for decoding.

The example processor circuitry 308 of the user device 302 illustrated in FIG. 3 includes video display controller circuitry 324. In some examples, the video display controller circuitry 324 is an integrated circuit included as a part of a video-signal generator or as a standalone structure on the processor circuitry 308. The example video display controller circuitry 324 can generate a video signal based on pixel data (e.g., the virtual tile(s) pixel data) received from the video decoder circuitry 322. The example video signal generated by the video display controller circuitry 324 is sent to the gate scan driver(s) and/or display driver(s) of the display screen 334 to cause pixels and/or subpixels of the display screen 334 to display pixel information based on the generated video signal.

The example processor circuitry 308 of the user device 302 illustrated in FIG. 3 includes duplicator circuitry 326. In some examples, the duplicator circuitry 326 can generate copies of video frame images within memory (e.g., DRAM 316). In some examples, the video decoder circuitry 322 can decode an initial full-frame video image from the bitstream. The example initial video frame can be used as intra-frame data (e.g., reference frame data) by the video decoder circuitry 322 for motion estimation in conjunction with video coding standards, such as H.264 AVC, H.265 HVEC, etc., to efficiently decode virtual tile(s) from a stream of video frame data. In some examples, the duplicator circuitry 326 can generate a plurality of copies of the intra-frame data in a memory buffer stored on volatile memory (e.g., DRAM 316). The example video decoder circuitry 322 and the example video display controller circuitry 324 can read from and/or write to the memory buffer during a video conference so that neither the video decoder circuitry 322 nor the video display controller circuitry 324 are waiting for processes to be completed by the other.

In examples disclosed herein, the term "intra-frame data" is used to describe video frame(s) for which pixel data of the video frame(s) are encoded into data bitstream(s) using compression algorithms (e.g., block matching algorithms). In examples disclosed herein, the term "inter-frame data" is used to described video frame(s) for which changed pixel data (e.g., pixels and/or objects in motion, foreground region(s), foreground bounding region(s), etc., sometimes referred to as important pixel data or pixel data relevant to a current frame encoding) are encoded into data bitstream(s) with associated motion vectors and unchanged pixel data (e.g., static and/or stationary pixels and/or objects, background region(s), background bounding region(s), etc., sometimes referred to as unimportant pixel data or pixel data not relevant to a current frame encoding) are encoded with associated motion vectors of (0, 0). In some examples, motion vectors are encoded for changed pixel data and unchanged pixel data. In such examples, motion estimation occurs for the changed pixel data at the expense of memory bandwidth, motion estimation does not occur for the unchanged pixel data, and (0, 0) is written for motion vectors of the unchanged pixel data (e.g., background region(s), background bounding region(s), etc.). Such examples of encoding techniques reduce memory bandwidth, are standards-compliant, and can be decoded with some (e.g., all and/or less than all) standard video coding hardware. For example codecs that use motion compensation can insert pixel data from the intra-frame data into the areas of the inter-frame data that have been assigned motion vector(s) of (0, 0) (e.g., discarded, disregarded, etc.). Some example inter-frame data can refer to previous frames in sequence of video data (e.g., "P-frames") to fill in areas of data with (0, 0) motion vector(s) (e.g., discarded areas, disregarded areas, etc.). Other example inter-frame data can refer to previous and future frames in a sequence of video data (e.g., bidirectional or "B-frames") to fill in areas of data with (0, 0) motion vector(s) (e.g., discarded areas, disregarded areas, etc.). In some instances, inter-frame data can reference intra-frame data directly or inter-frame data can reference other inter-frame data of frames that have been reconstructed.

Figure 4:
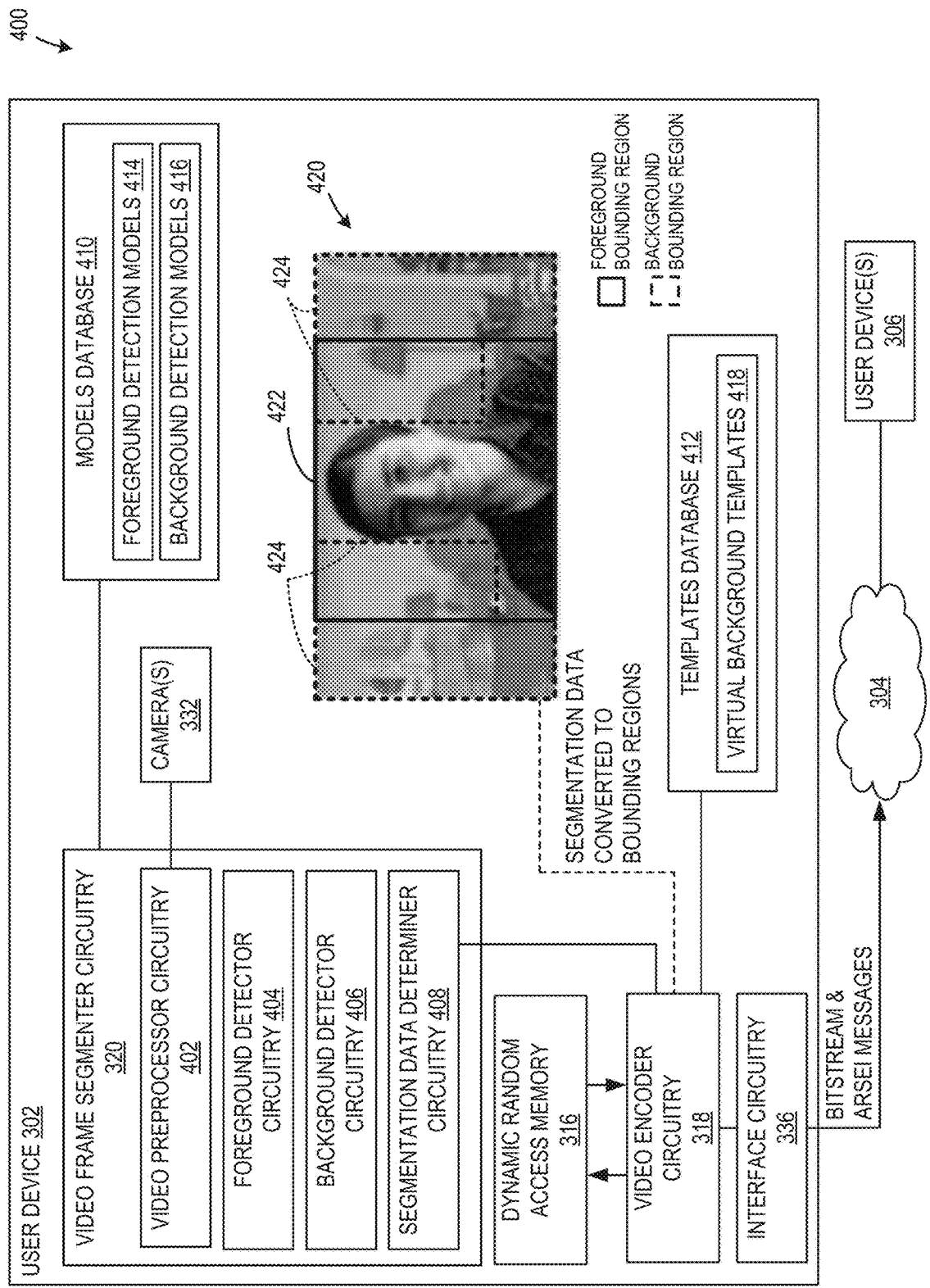
FIG. 4 is a block diagram of an example implementation of the video frame segmenter circuitry and the video encoder circuitry of the user device of FIG. 3.

FIG. 4 is a block diagram of an example system 400 including the example user device 302 of FIG. 3 to encode images of video into a bitstream. In example FIG. 4, the user device 302 is structured to determine segmentation data corresponding to a video frame, determine foreground bounding region(s) and background bounding region(s) based on the segmentation data, determine and encode the virtual tiles of the video frame based on the bounding regions, write ARSEI messages with field code labels indicating the foreground bounding region(s) and the background bounding region(s), and transmit an encoded bitstream and the ARSEI messages in accordance with teachings of this disclosure. The example user device 302 of FIG. 4 may be instantiated (e.g., creating an instance of, bring into being for any length of time, materialize, implement, etc.) by processor circuitry 308 such as a central processor unit executing instructions. Additionally or alternatively, the user device 302 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more virtual machines and/or containers executing on the microprocessor.

In some examples, the user device(s) 302 include the video frame segmenter circuitry 320 as shown in FIG. 4. The example video frame segmenter circuitry 320 includes video preprocessor circuitry 402, foreground detector circuitry 404, background detector circuitry 406, and segmentation data determiner circuitry 408. The example user device 302 further includes a models database 410 and a templates database 412. The example models database 410 stores foreground detection models 414 and background detection models 416 for the artificial neural network implemented by the video frame segmenter circuitry 320. The example templates database 412 stores virtual background templates 418 that the user can select for use in replacing the background region(s) of the video frame during a video conference.

In the example illustrated in FIG. 4, the video preprocessor circuitry 402 samples a video stream signal output by the camera(s) 332. In some examples, the video preprocessor circuitry 402 down samples and/or reduces a frame rate of the video stream signal. The example video preprocessor circuitry 402 generates processed video frame(s) as a result of the sampling. The processed video frame(s) can be stored in the example models database 410. In some examples, the video frame segmenter circuitry 320 includes the models database 410. In other examples, the models database 410 is located external to the video frame segmenter circuitry 320 in a location accessible to the video frame segmenter circuitry 320 as shown in FIG. 4.

The example foreground detector circuitry 404 detects pixel data in foreground region(s) of the processed video frames. In examples disclosed herein, a foreground region is a portion (e.g., a rectangular area) of the video frame that includes the user and some background portions of the video frame. In some examples, the camera(s) 332 capture video image(s) of more than one users of the user device 302 in the same video frame(s). In such examples, the foreground detector circuitry 404 detects a number of foreground regions corresponding to the number of users in the video frame(s).

In the example illustrated in FIG. 4, the foreground detector circuitry 404 executes one or more neural network model(s) to detect the pixel data in the foreground region(s) of the respective processed video frame(s). For example, the example foreground detector circuitry 404 of FIG. 4 executes one or more foreground detection model(s) 414 to detect pixel data in region(s) (e.g., rectangular region(s)) of the video frame(s) that includes the user(s) and portions of the background region(s) of the video frame(s). In some examples, the foreground detection model(s) 414 are generated as a result of neural network training. In the example of FIG. 4, the foreground detection model(s) 414 are stored in the models database 410.

The example background detector circuitry 406 detects pixel data in background region(s) of the processed video frames. In examples disclosed herein, a background region is one or more portions of the video frame that include the static and/or background areas of the video frame in which the user is not located. In the example of FIG. 4, the background detector circuitry 406 executes one or more neural network model(s) to detect the pixel data in background region(s) of the respective preprocessed video frame(s). For example, the example background detector circuitry 406 of FIG. 4 executes one or more background detection model(s) 416 to detect pixel data in region(s) of the video frame(s) that do not include user(s) in the video frame(s). Thus, the example background detector circuitry 406 recognizes portion(s) of the video frame(s) that include(s) pixel data corresponding to the area behind user(s). In some examples, the background detector circuitry 406 detects pixel data in the background region(s) that overlap the foreground region(s). In some examples, the background detection model(s) 416 are generated as a result of neural network training. In the example of FIG. 4, the background detection model(s) 416 are stored in the models database 410.

The example segmentation data determiner circuitry 408 determines segmentation data (e.g., metadata) corresponding to the pixel data in the foreground region(s) and the background region(s) detected by the foreground detector circuitry 404 and the background detector circuitry 406. The example foreground detector circuitry 404 and the example background detector circuitry 406 send the pixel data that is in the foreground region(s) and background region(s), respectively, to the segmentation data determiner circuitry 408. In some examples, the segmentation data determiner circuitry 408 applies segmentation mask(s) to the pixel data corresponding to the region(s) in which to the pixel data is located in a video frame. In such examples, the segmentation mask identifies, labels, indicates, etc. which pixel data sent to the video encoder circuitry 318 belongs to which region(s) (e.g., foreground or background).

The example video encoder circuitry 318 of the user device 302 illustrated in FIG. 4 determines foreground bounding region(s) and background bounding region(s) based on the segmentation data generated by the segmentation data determiner circuitry 408. An example video frame image 420 depicting a user of the associated local user device 302 during an example video conference is shown in FIG. 4. The example video frame image 420 is shown to represent metadata (e.g., foreground bounding region(s) 422 and background bounding regions 424) determined by the video encoder circuitry 318 in the form of solid and dashed lines in the video frame image 420. The example foreground bounding region 422 is illustrated in the example video frame 420 as a solid-lined rectangle encompassing the user of the user device 302. The example background bounding regions 424 are illustrated in the example video frame 420 as dash-lined rectangles surrounding sections of the video frame that do not include the user of the user device 302.

In some examples, the video encoder circuitry 318 may determine that pixel data corresponding to foreground region(s) indicated by the segmentation data fits within a bounding region (e.g., a rectangular bounding box) of 400 pixels by 400 pixels, that the top-left corner of the bounding region is located at pixel (480, 0) (e.g., relative to an origin at the top-left corner of the video frame), and that the bounding region is of the "foreground" type (e.g., the foreground bound region 422). In some examples, the video encoder circuitry 318 may determine that pixel data corresponding to background region(s) indicated by the segmentation data fits within a bounding region (e.g., a background bounding box) of 100 pixels by 300 pixels, that the top-left corner of the bounding region is located at pixel (480, 0) (e.g., relative to an origin at the top-left corner of the video frame), and that the bounding region is of the "background" label and/or type (e.g., the background bounding regions 424). In these examples, the background bounding region 424 is overlapping the foreground bounding region 422. In some examples, multiple background bounding regions 424 can be detected by the video encoder circuitry 318 that overlap the foreground bounding region 422. In examples disclosed herein, the region(s) of the video frame in which the background bounding region(s) 424 do not overlap the foreground bounding region 422 is referred to as a virtual tile.

In the illustrated example of FIG. 4, the video encoder circuitry 318 determines the virtual tile by parsing the foreground bounding region(s) 422 and the background bounding region(s) 424 and determining which areas of the two or more bounding regions do not overlap. In some examples, the virtual tile includes video frame pixel data that represents the user of the user device 302. Although four example background bounding regions 424 are illustrated in the example video frame image 420, more background bounding regions of varying sizes can be determined by the video encoder circuitry 318 to refine the virtual tile such that the virtual tile contains fewer pixels of the background regions than what is shown in the example video frame image 420. In some examples, the video encoder circuitry 318 determines the motion vector of the pixel data and/or the blocks (e.g., macroblocks, coding tree units, etc.) in the virtual tile(s). The example motion vector is written into the bitstream and corresponds to the pixel data and/or block (e.g., macroblock, coding tree unit, etc.) compressed in bit form. In some examples, the video encoder circuitry 318 writes motion vectors of (0, 0) for the pixel data and/or blocks of pixel data (e.g., macroblocks, coding tree units, etc.) that are not included in the virtual tile(s).

In some examples, the video encoder circuitry 318 reads from and/or writes to DRAM 316 of the user device 302. The example video encoder circuitry 318 may store pixel data of the video frame pixel data received from the video frame segmenter circuitry 320 in the DRAM 316 for future processing. In some examples, to reduce memory bandwidth consumed relative to processing and/or transmitting full-frame pixel data, the video encoder circuitry 318 may read and/or write pixel data in the virtual tile(s) to process (e.g., encode) and/or to transmit exclusive of pixel data outside the virtual tile(s). For example, the pixel data in the virtual tile(s) may include one-third of the overall video frame pixel data, the video frame pixel data may have a resolution of 1920×1080 pixels, and the video frame pixel data may be generated at a frame rate of 30 frames per second. In such examples, if the video encoder circuitry 318 encodes just the virtual tile(s) of the video frame pixel data, the example user device 302 (FIGS. 3 and 4) can save 60 MBps of memory bandwidth. In some examples, the video encoder circuitry 318 reads virtual tile data from the DRAM 316, encodes the pixel data of the virtual tile, and writes ARSEI messages including field codes (e.g., "label" field codes) that identify which pixels are in the foreground bounding region(s) and which pixels are in the background bounding region(s). In some examples, the ARSEI messages include size data (e.g., pixel width and pixel height), location data (e.g., the top-left (x, y) coordinate in the video frame), or label data (e.g., foreground and/or background) corresponding to the foreground bounding region(s) and the background bounding region(s). The example video encoder circuitry 318 provides the bitstream and/or the ARSEI message(s) to the example interface circuitry 336 to be transmitted The example interface circuitry 336 may transmit the bitstream and the ARSEI messages to one or more user devices 306 via the network 304 using one or more protocols (e.g., voice-over-internet protocols).

In some examples, the user of the user device 302 selects a virtual background to replace the background bounding region(s) determined by the video encoder circuitry 318. The example virtual background selected by the user can be a photographed image, a computer-generated image, a solid color, a pattern of colors, etc. In some examples, the background replacement selected by the user is a blurred version of the background in the video frame(s) the camera(s) 332 capture or a blurred version of the previously mentioned virtual background selection(s). In some examples, an identifier of the virtual background selected by the user is written into a field code of a supplemental enhancement information (SEI) message(s). In such examples, the SEI message(s) can be read by video decoder circuitry 322 of the user device(s) 306 and used to replace the background bounding region(s) with the virtual background indicated by the SEI message(s) if the same virtual background is availably stored in a database on the user device(s) 306. The example video encoder circuitry 318 provides the SEI message(s) to the example interface circuitry 336 to be transmitted. In some examples, the interface circuitry 336 sends (e.g., transmits) the SEI message(s) to the user device(s) 306 via the network 304 with the associated bitstream and ARSEI message(s).

In some examples, the user selects a replacement background from a data store of virtual background templates 418 stored in the templates database 412. In some instances, the video encoder circuitry 318 includes the templates database 412. In other examples, the templates database 412 is located external to the video encoder circuitry 318 in a location accessible to the video encoder circuitry 318 as shown in FIG. 4. In some examples, the models database 410 and the templates database 412 are implemented in the same database.

Figure 5:
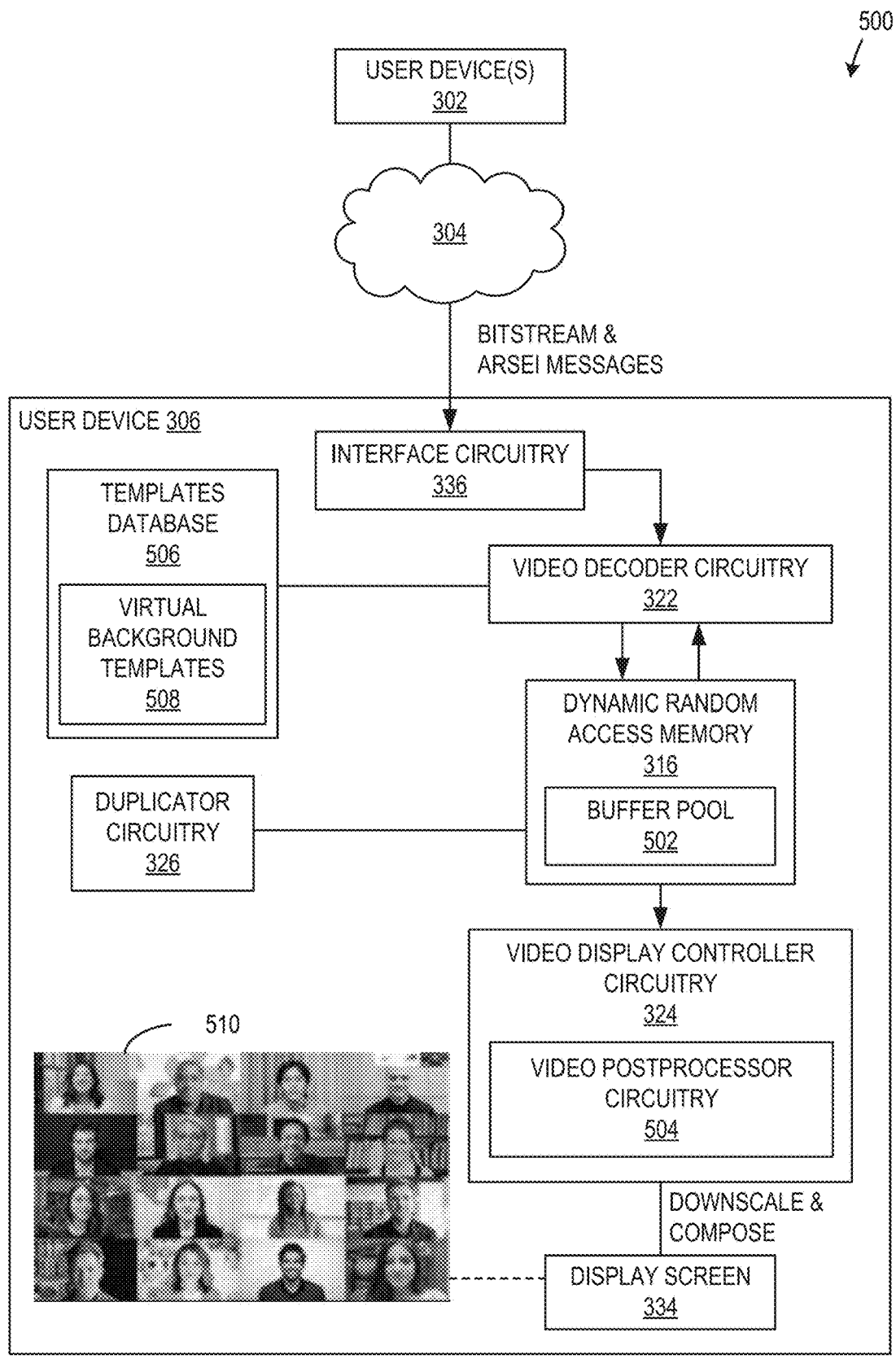
FIG. 5 is a block diagram of an example implementation of the video decoder circuitry and the video display controller circuitry of the user device of FIG. 3.

FIG. 5 is a block diagram of an example system 500 including the example user device 306 as illustrated in FIG. 3 to decode a video bitstream. For example, the system 500 is structured to determine foreground bounding region(s) and background bounding region(s) of encoded video frame data based on the ARSEI message(s), determine the virtual tile of the video frame pixel data, decode the relevant portions the virtual tile(s) of the video frame from the bitstream, read and/or write intra-frame data and inter-frame data from and/or to a memory buffer, and generate video signals of the decoded video frames for display. The example user device 306 of FIG. 5 may be instantiated (e.g., creating an instance of, bring into being for any length of time, materialize, implement, etc.) by processor circuitry 308 such as a central processor unit executing instructions. Additionally or alternatively, the example user device 306 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

In some examples, the user device 306 includes the video decoder circuitry 322, DRAM 316, video display controller circuitry 324, duplicator circuitry 326, the display screen 334, and the interface circuitry 336 as illustrated in FIG. 3. The example user device 306 illustrated in FIG. 5 may also include the same and/or functionally equivalent circuitry, memories, devices, etc. as those illustrated in the user device 302 in FIG. 3 to encode images of video into a bitstream during an encode phase. Similarly, the example user device 302 may include the same and/or functionally equivalent circuitry, memories, devices, etc. as those illustrated in the user device 306 in FIG. 5 to decode a bitstream during a decode phase. The example system 500 illustrated in FIG. 5 represents the user device 306 receiving encoded bitstream data and ARSEI message(s) from the example user device 302 and/or a plurality of user devices 302 (e.g., 15 user devices and/or any other number of user devices) of the example systems 300 and/or 400 illustrated in FIGS. 3 and/or 4.

In some examples, the DRAM 316 illustrated in FIG. 5 includes a buffer pool 502 that stores a dynamic buffer of intra-frame data and inter-frame data (e.g., updated intra-frame data). The example video display controller circuitry 324 illustrated in FIG. 5 includes video postprocessor circuitry 504 to downscale and compose the decoded video frame(s) to form a grid of video frame(s) displayed by the display screen 334. The example user device 306 also includes a database 506, which includes virtual background templates 508 that can wholly or partially match the virtual background templates 418 stored on the user device(s) 302.

The example interface circuitry 336 illustrated in FIG. 5 receives bitstream(s) of data and ARSEI message(s) from the user device(s) 302. In some examples, the interface circuitry 336 receives SEI message(s) from the user device 302 associated with the bitstream(s). The example SEI message(s) include field codes indicating the virtual background template(s) selected by the user of user device(s) 302. The example interface circuitry 336 provides the bitstream, the ARSEI message(s), and/or the SEI message(s) to the example video decoder circuitry 322 of FIG. 5.

In some examples, the video decoder circuitry 322 determines foreground bounding region(s) (e.g., the foreground bounding region 422 of FIG. 4) and background bounding region(s) (e.g., the background bounding regions 424 of FIG. 4) of the bitstream based on the size data, location data, and label data associated with the ARSEI message(s). The video decoder circuitry 322 determines virtual tile(s) of the encoded video frame pixel data by determining which encoded pixel data of the foreground bounding region(s) do not overlap with the encoded pixel data of the background bounding region(s). The video decoder circuitry 322 can then decode the virtual tile(s) from the bitstream while discarding the bitstream data corresponding to the pixel data outside the virtual tile(s). For example, the encoded pixel data of the virtual tile(s) may include one-third of the overall encoded video frame pixel data, the encoded video frame pixel data may have a resolution of 1920×1080 pixels, the video frame pixel data may be displayed at a frame rate of 30 frames per second, and sixteen different bitstreams of encoded video frame pixel data may be received by the example user device 306 simultaneously (e.g., within +/−1 millisecond). In such examples, if the video decoder circuitry 318 decodes the virtual tiles of the 16 bitstreams of encoded video frame pixel data, the example user device 306

(FIGS. 3-5) can save one GBps of memory bandwidth. In some examples, the video decoder circuitry 322 decodes bitstream data that have a non-zero motion vector and discards bitstream data that have motion vectors of (0, 0). In such examples, the bitstream data are parsed rather than the ARSEI message(s), which results in greater processing power and memory bandwidth usage.

The example video decoder circuitry 322 of FIG. 5 decodes the virtual tile(s) of the incoming bitstream data. In some examples, the virtual tile(s) of the initial video frame decoded from the bitstream are reconstructed with the virtual background selected by the user of user device(s) 302. In some instances, the initial video frame that gets decoded and reconstructed is referred to as the intra-frame data (e.g., reference frame data). In examples disclosed herein, the term "initial" video frame refers to the first video frame decoded from a new bitstream of incoming encoded video frame pixel data.

In some examples, the virtual background used to reconstruct the intra-frame data is determined by a label field coded in an example SEI message the video decoder circuitry 322 receives. In some examples, the video decoder circuitry 322 reads the virtual background from a data store of virtual background templates 508 stored in a templates database 506. In some examples, the video decoder circuitry 322 includes the templates database 506. In other examples, the templates database 506 is located external to the video decoder circuitry 322 in a location accessible to the video decoder circuitry 322 as shown in FIG. 5. In some examples, the virtual background selected by the user of the user device 302 is not available in the templates database 506. In such examples, the bitstream may include an encoded frame of the virtual background template for storage in the templates database 506 or some other storage location.

The example video decoder circuitry 322 decodes the virtual tile(s) of the initial video frame pixel data decoded from the bitstream sent from the user device(s) 302. The example video decoder circuitry 322 reconstructs the intra-frame data including the initial decoded virtual tile(s) and the selected virtual background. The example video decoder circuitry 322 stores the intra-frame data in the buffer pool 502. The example duplicator circuitry 326 makes a plurality of copies of the intra-frame data in the buffer pool 502. In some examples, the duplicator circuitry 326 is integrated on the processor circuitry 308. In other examples, the duplicator circuitry 326 is formed on the same integrated circuit that includes the DRAM 316. In other examples, the DRAM 316 includes circuitry that implements functionality to create copies of the data saved in memory and/or the buffer pool 502.

The example user device 306 includes video display controller circuitry 324 that reads video frame image data from the buffer pool 502. The example video display controller circuitry 324 can also write video frame pixel data back into the buffer pool 502. In some examples, the video decoder circuitry 322 and the video display controller circuitry 324 write and read the copies of the intra-frame data and/or modified intra-frame data to and from the buffer pool 502 simultaneously and/or at substantially similar times (e.g., within +/−1 millisecond). More detailed explanations of the processing order of reads and writes from and to the buffer pool 502 by the video decoder circuitry 322 and the video display controller circuitry 324 are described below.

In some examples, the video display controller circuitry 324 generates video signals corresponding to the pixel data retrieved from the buffer pool 502. The example video display controller circuitry 324 includes video postprocessor circuitry 504 to sample the video frame(s) stored in the buffer pool 502. In some examples, the video postprocessor circuitry 504 down samples and/or reduces a frame rate of the video frame pixel data. The video postprocessor circuitry 504 generates processed video frame(s) as a result of the sampling. In some examples, the video postprocessor circuitry 504 composes the processed video frame(s) into a grid of video frames (e.g., 4 frames by 4 frames) as shown in example display grid 510. The composed grid of video frame pixel data is sent to the example display screen 334 to emit light via pixels and subpixels according to the pixel data sent from the example video postprocessor circuitry 504.

Figure 6:
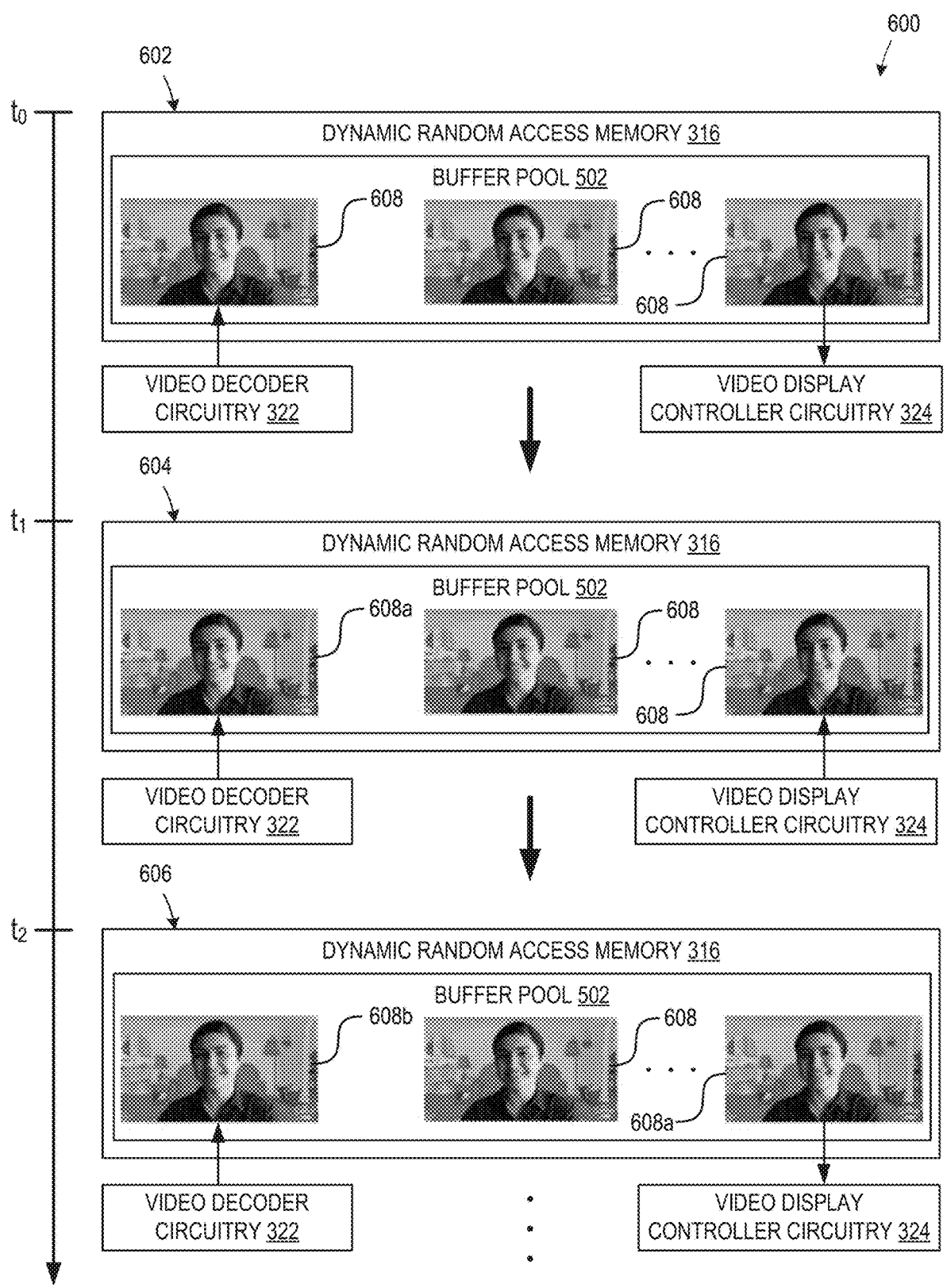
FIG. 6 illustrates an example buffer pool in which read and write operations are performed by the video decoder circuitry and the video display controller circuitry of FIGS. 3 and 5 at different times.

FIG. 6 shows an example timeline 600 during which video frames are read from and written to the buffer pool 502 illustrated in FIG. 5 as located in the DRAM 316. The example timeline 600 illustrated in FIG. 6 shows three different states (602, 604, and 606) of the buffer pool 502 at three distinct temporal instances ($t_0$, $t_1$, and $t_2$). In some examples, the time difference between instances $t_0$, $t_1$, and $t_2$ is dependent on the video frame rate of the video conferencing application (e.g., +/−30 milliseconds between instances). The example state 602 of the DRAM 316 illustrates the video decoder circuitry 322 storing the intra-frame data 608 in the buffer pool 502 at time to. At a substantially similar time (e.g., +/−10 milliseconds), the duplicator circuitry 326 (FIGS. 3 and 5) generates copies of the example intra-frame data 608, and the video display controller circuitry 324 reads an instance of the example intra-frame data 608 from the buffer pool 502.

The example state 604 of the DRAM 316 illustrated in FIG. 6 shows the video decoder circuitry 322 updating a copy of the intra-frame data 608 in the buffer pool 502 at time $t_1$. At example state 604, the video decoder circuitry 322 replaces the virtual tile of the intra-frame data 608 with the virtual tile of the current decoded video frame to create inter-frame data 608a in the buffer pool 502. In examples disclosed herein, inter-frame data refers to frame data that depends on another frame such as intra-frame data (e.g., reference frame data) for motion estimation. The example inter-frame data can be generated by updating the virtual tile(s) of the intra-frame data or of inter-frame data already stored in the buffer pool 502. At a substantially similar time (e.g., +/−10 milliseconds), the video display controller circuitry 324 writes the intra-frame data 608 back into the buffer pool 502 after the video signal corresponding to the intra-frame data 608 was generated and sent to the display screen 334 (FIGS. 3 and 5).

The example state 606 of the DRAM 316 illustrated in FIG. 6 shows the video decoder circuitry 322 updating the next frame data in the buffer pool 502 queue (e.g., a copy of the intra-frame data 608 or an inter-frame data (e.g., inter-frame data 608a)) at time $t_2$. At example state 606, the video decoder circuitry 322 replaces the virtual tile(s) of the next frame data in the buffer pool 502 queue with the virtual tile of the current decoded video frame to create inter-frame data 608b in the buffer pool 502. At a substantially similar time (e.g., +/−10 milliseconds), the video display controller circuitry 324 reads the previously updated example inter-frame data 608a from the buffer pool 502.

In a next temporal state not shown in FIG. 6, the example video decoder circuitry 322 is structured to update the next queued frame data in the buffer pool 502 with the currently decoded virtual tile(s), and the video display controller circuitry 324 is structured to write the example inter-frame data 608a back into the buffer pool 502 for subsequent updating. The example timeline 600 illustrated in FIG. 6 continues until the video conference ends or until the user device 302 (FIGS. 3-5) transmitting frame data to the example video decoder circuitry 322 changes the selected virtual background template. If the example user device 302 selects a new virtual background during the video conference, a new intra-frame data is generated by the video decoder circuitry 322 and the example process 600 restarts at a new initial temporal instance to.

Figure 7:
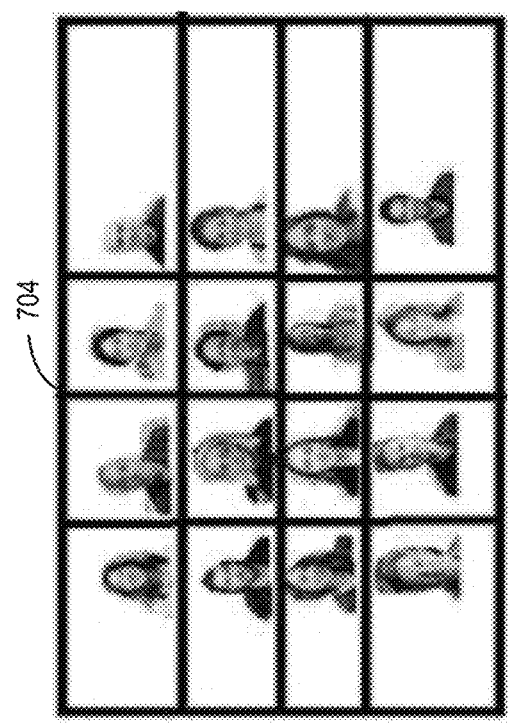
FIG. 7 is an example representation of video frames decoded by the example video decoder circuitry of FIGS. 3 and 5 in a low-power mode and displayed on a user device in accordance with teachings of this disclosure.
Figure 7:
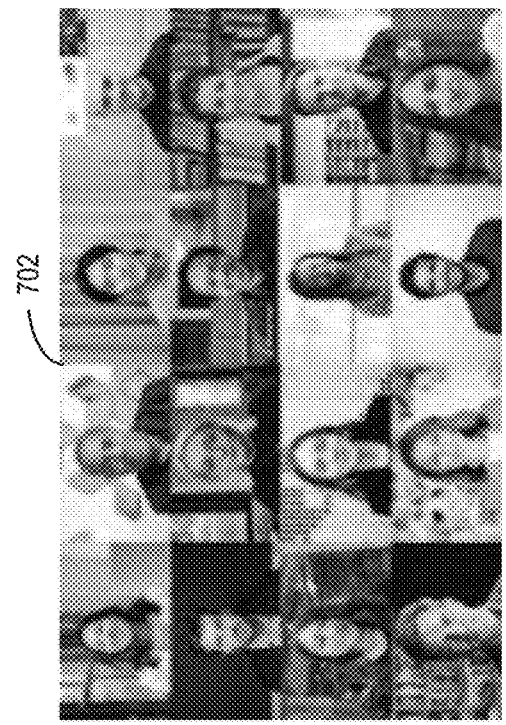

FIG. 7 illustrates an example representation 700 of video frame grid output displays in two different operation modes of the example user device 306 illustrated in FIGS. 3 and 5. An example standard video frame output 702 is illustrated in FIG. 7 to show an example grid of displayed video frames using the example system 300 and/or the example system 500. An example low-power video frame output 704 is illustrated in FIG. 7 to show an example grid of displayed video frames when the example user device 302 and/or the example user device 306 is operating at or below a threshold battery power (e.g., 10% battery life) representative of limited remaining battery power (e.g., low battery power or critically low battery power). In some examples, a low-power mode will result in a display of video frame images with the virtual background template replaced with a white background.

In some examples, the user device 302 of FIGS. 3, 4, and/or 5 is operating with a battery power at or below a low-power threshold (e.g., 10% battery power). In such cases, the example video encoder circuitry 318 encodes video frame pixel data corresponding to a downscaled video frame. In some examples, the video encoder circuitry 318 generates bitstream data and ARSEI message(s) corresponding to the video frame data in the foreground bounding region(s) instead of the full frame data. In such examples, the video encoder circuitry 318 does not generate bitstreams related to background bounding region(s) that are not also in the foreground bounding region(s). The encoded bitstream and associated ARSEI message(s) are still processed in reference to the full frame image size. For example, the virtual tile will still be displayed in the frame at the same placement as it would be in the standard power mode, but with a white background. In some low-power mode examples, the video encoder circuitry 318 does not generate SEI message(s) indicating the virtual background to be used in the video frame display. Operating the video encoder circuitry 318 in the low-power mode saves memory bandwidth and processing power because the ARSEI message(s) generated and transmitted are associated with the foreground bounding region(s) instead of the full video frame.

In some examples, the user device 306 of FIGS. 3, 4, and/or 5 is operating with a battery power at or below the example low-power threshold. In such cases, the example video decoder circuitry 322 does not generate intra-frame data with the virtual background chosen by the user of example user device 302. Instead, the intra-frame data is composed of the decoded virtual tile(s) with a white background. Since the ARSEI message(s) sent in the low-power save more and/or the standard mode include pixel location data with respect to the full frame, the example virtual tile(s) of the low-power mode are placed at the same pixel coordinates as the virtual tile(s) of the standard mode. Operating the example video decoder circuitry 322 in the low-power mode saves memory bandwidth and processing power because the video decoder circuitry 322 does not parse ARSEI message(s) for a full frame at each decoding instance, the video decoder circuitry 322 does not construct the intra-frame data with a virtual background, and the video decoder circuitry 322 does not reference the example virtual background templates 508 when updating the intra-frame data and/or inter-frame data in the buffer pool 502.

In some examples, the apparatus includes means for encoding video. For example, the means for encoding video may be implemented by the video encoder circuitry 318. In some examples, the video encoder circuitry 318 may be instantiated by processor circuitry such as the example processor circuitry 1112 of FIG. 11. For instance, the video encoder circuitry 318 may be instantiated by the example general purpose processor circuitry 1200 of FIG. 12 executing machine executable instructions such as that implemented by at least blocks 810-824 of FIG. 8. In some examples, the video encoder circuitry 318 may be instantiated by hardware logic circuitry, which may be implemented by an ASIC or the FPGA circuitry 1300 of FIG. 13 structured to perform operations corresponding to the machine readable instructions. Additionally or alternatively, the video encoder circuitry 318 may be instantiated by any other combination of hardware, software, and/or firmware. For example, the video encoder circuitry 318 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining segmentation data of video frame(s). For example, the means for determining segmentation data of video frame(s) may be implemented by the video frame segmenter circuitry 320. In some examples, the video frame segmenter circuitry 320 may be instantiated by processor circuitry such as the example processor circuitry 1112 of FIG. 11. For instance, the video frame segmenter circuitry 320 may be instantiated by the example general purpose processor circuitry 1200 of FIG. 12 executing machine executable instructions such as that implemented by at least blocks 802-808 of FIG. 8. In some examples, the video frame segmenter circuitry 320 may be instantiated by hardware logic circuitry, which may be implemented by an ASIC or the FPGA circuitry 1300 of FIG. 13 structured to perform operations corresponding to the machine readable instructions. Additionally or alternatively, the video frame segmenter circuitry 320 may be instantiated by any other combination of hardware, software, and/or firmware. For example, the video frame segmenter circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for decoding video data (e.g., a bitstream). For example, the means for decoding video data may be implemented by the video decoder circuitry 322. In some examples, the video decoder circuitry 322 may be instantiated by processor circuitry such as the example processor circuitry 1112 of FIG. 11. For instance, the video decoder circuitry 322 may be instantiated by the example general purpose processor circuitry 1200 of FIG. 12 executing machine executable instructions such as that implemented by at least blocks 902-914 and 926 of FIG. 9 and 1002-1006, 1010-14 of FIG. 10. In some examples, the video decoder circuitry 322 may be instantiated by hardware logic circuitry, which may be implemented by an ASIC or the FPGA circuitry 1300 of FIG. 13 structured to perform operations corresponding to the machine readable instructions. Additionally or alternatively, the video decoder circuitry 322 may be instantiated by any other combination of hardware, software, and/or firmware. For example, the video decoder circuitry 322 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating video signals corresponding to decoded video frame data. For example, the means for generating video signals may be implemented by the video display controller circuitry 324. In some examples, the video display controller circuitry 324 may be instantiated by processor circuitry such as the example processor circuitry 1112 of FIG. 11. For instance, the video display controller circuitry 324 may be instantiated by the example general purpose processor circuitry 1200 of FIG. 12 executing machine executable instructions such as that implemented by at least blocks 916, 922, and 924 of FIG. 9. In some examples, the video display controller circuitry 324 may be instantiated by hardware logic circuitry, which may be implemented by an ASIC or the FPGA circuitry 1300 of FIG. 13 structured to perform operations corresponding to the machine readable instructions. Additionally or alternatively, the video display controller circuitry 324 may be instantiated by any other combination of hardware, software, and/or firmware. For example, the video display controller circuitry 324 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for duplicating intra-frame data in a buffer pool. For example, the means for duplicating intra-frame data may be implemented by the duplicator circuitry 326. In some examples, the duplicator circuitry 326 may be instantiated by processor circuitry such as the example processor circuitry 1112 of FIG. 11. For instance, the duplicator circuitry 326 may be instantiated by the example general purpose processor circuitry 1200 of FIG. 12 executing machine executable instructions such as that implemented by at least blocks 1008 of FIG. 10. In some examples, the duplicator circuitry 326 may be instantiated by hardware logic circuitry, which may be implemented by an ASIC or the FPGA circuitry 1300 of FIG. 13 structured to perform operations corresponding to the machine readable instructions. Additionally or alternatively, the duplicator circuitry 326 may be instantiated by any other combination of hardware, software, and/or firmware. For example, the duplicator circuitry 326 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for downscaling captured video frame pixel data. For example, the means for downscaling may be implemented by the video preprocessor circuitry 402. In some examples, the video preprocessor circuitry 402 may be instantiated by processor circuitry such as the example processor circuitry 1112 of FIG. 11. For instance, the video preprocessor circuitry 402 may be instantiated by the example general purpose processor circuitry 1200 of FIG. 12 executing machine executable instructions such as that implemented by at least blocks 802 and 804 of FIG. 8. In some examples, the video preprocessor circuitry 402 may be instantiated by hardware logic circuitry, which may be implemented by an ASIC or the FPGA circuitry 1300 of FIG. 13 structured to perform operations corresponding to the machine readable instructions. Additionally or alternatively, the video preprocessor circuitry 402 may be instantiated by any other combination of hardware, software, and/or firmware. For example, the video preprocessor circuitry 402 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for detecting foreground portion(s) of video frame pixel data. For example, the means for detecting foreground portion(s) of video frame pixel data may be implemented by the foreground detector circuitry 404. In some examples, the foreground detector circuitry 404 may be instantiated by processor circuitry such as the example processor circuitry 1112 of FIG. 11. For instance, the foreground detector circuitry 404 may be instantiated by the example general purpose processor circuitry 1200 of FIG. 12 executing machine executable instructions such as that implemented by at least blocks 806 of FIG. 8. In some examples, the foreground detector circuitry 404 may be instantiated by hardware logic circuitry, which may be implemented by an ASIC or the FPGA circuitry 1300 of FIG. 13 structured to perform operations corresponding to the machine readable instructions. Additionally or alternatively, the foreground detector circuitry 404 may be instantiated by any other combination of hardware, software, and/or firmware. For example, the foreground detector circuitry 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for detecting background portion(s) of video frame pixel data.

For example, the means for detecting background portion(s) of video frame pixel data may be implemented by the background detector circuitry 406. In some examples, the background detector circuitry 406 may be instantiated by processor circuitry such as the example processor circuitry 1112 of FIG. 11. For instance, the background detector circuitry 406 may be instantiated by the example general purpose processor circuitry 1200 of FIG. 12 executing machine executable instructions such as that implemented by at least blocks 806 of FIG. 8. In some examples, the background detector circuitry 406 may be instantiated by hardware logic circuitry, which may be implemented by an ASIC or the FPGA circuitry 1300 of FIG. 13 structured to perform operations corresponding to the machine readable instructions. Additionally or alternatively, the background detector circuitry 406 may be instantiated by any other combination of hardware, software, and/or firmware. For example, the background detector circuitry 406 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating segmentation data based on the foreground portion(s) and background portion(s) of the video frame pixel data. For example, the means for generating segmentation data may be implemented by the segmentation data determiner circuitry 408. In some examples, the segmentation data determiner circuitry 408 may be instantiated by processor circuitry such as the example processor circuitry 1112 of FIG. 11. For instance, the segmentation data determiner circuitry 408 may be instantiated by the example general purpose processor circuitry 1200 of FIG. 12 executing machine executable instructions such as that implemented by at least blocks 808 of FIG. 8. In some examples, the segmentation data determiner circuitry 408 may be instantiated by hardware logic circuitry, which may be implemented by an ASIC or the FPGA circuitry 1300 of FIG. 13 structured to perform operations corresponding to the machine readable instructions. Additionally or alternatively, the segmentation data determiner circuitry 408 may be instantiated by any other combination of hardware, software, and/or firmware. For example, the segmentation data determiner circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for downscaling and composing decoded video frame pixel data. For example, the means for downscaling and composing may be implemented by the video postprocessor circuitry 504. In some examples, the video postprocessor circuitry 504 may be instantiated by processor circuitry such as the example processor circuitry 1112 of FIG. 11. For instance, the video postprocessor circuitry 504 may be instantiated by the example general purpose processor circuitry 1200 of FIG. 12 executing machine executable instructions such as that implemented by at least blocks 918 and 920 of FIG. 9. In some examples, the video postprocessor circuitry 504 may be instantiated by hardware logic circuitry, which may be implemented by an ASIC or the FPGA circuitry 1300 of FIG. 13 structured to perform operations corresponding to the machine readable instructions. Additionally or alternatively, the video postprocessor circuitry 504 may be instantiated by any other combination of hardware, software, and/or firmware. For example, the video postprocessor circuitry 504 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the user device 302 and/or the user device(s) 306 of FIG. 3 is illustrated in FIGS. 4 and/or 5, one or more of the elements, processes, and/or devices illustrated in FIGS. 4 and/or 5 may be combined, divided, re-arranged, omitted, eliminated, and/or implemented in any other way. Further, the example video encoder circuitry 318, the example video frame segmenter circuitry 320, the example video decoder circuitry 322, the example video display controller circuitry 324, the example duplicator circuitry 326, the example video preprocessor circuitry 402, the example foreground detector circuitry 404, the example background detector circuitry 406, the example segmentation data determiner circuitry 408, the example video postprocessor circuitry 504, and/or, more generally, the example user device 302 and/or the example user device(s) 306 of FIG. 3, may be implemented by hardware alone or by hardware in combination with software and/or firmware. Thus, for example, any of the example video encoder circuitry 318, the example video frame segmenter circuitry 320, the example video decoder circuitry 322, the example video display controller circuitry 324, the example duplicator circuitry 326, the example video preprocessor circuitry 402, the example foreground detector circuitry 404, the example background detector circuitry 406, the example segmentation data determiner circuitry 408, the example video postprocessor circuitry 504, and/or, more generally, the example user device 302 and/or the example user device(s) 306 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example user device 302 and/or the example user device(s) 306 of FIG. 3 of FIG. 3 may include one or more elements, processes, and/or devices in addition to, or instead of, those illustrated in FIGS. 4 and/or 5, and/or may include more than one of any or all of the illustrated elements, processes and devices.

Figure 8:
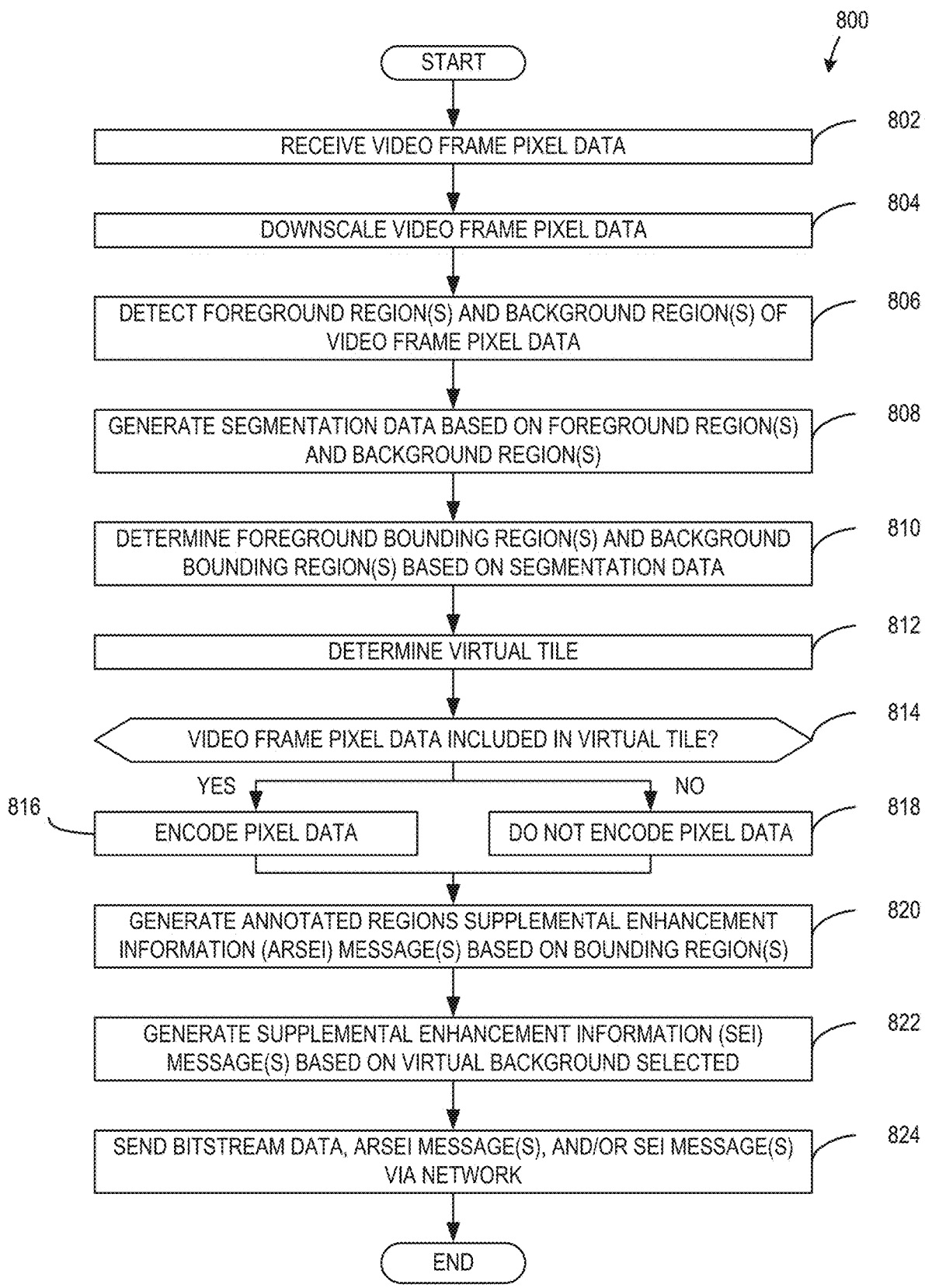
FIG. 8 is a flowchart representative of example machine readable instructions and/or operations that may be executed and/or instantiated by example processor circuitry to implement the video frame segmenter circuitry and the video encoder circuitry of FIGS. 3 and/or 4 to segment, encode, and transmit video frames.
Figure 9:
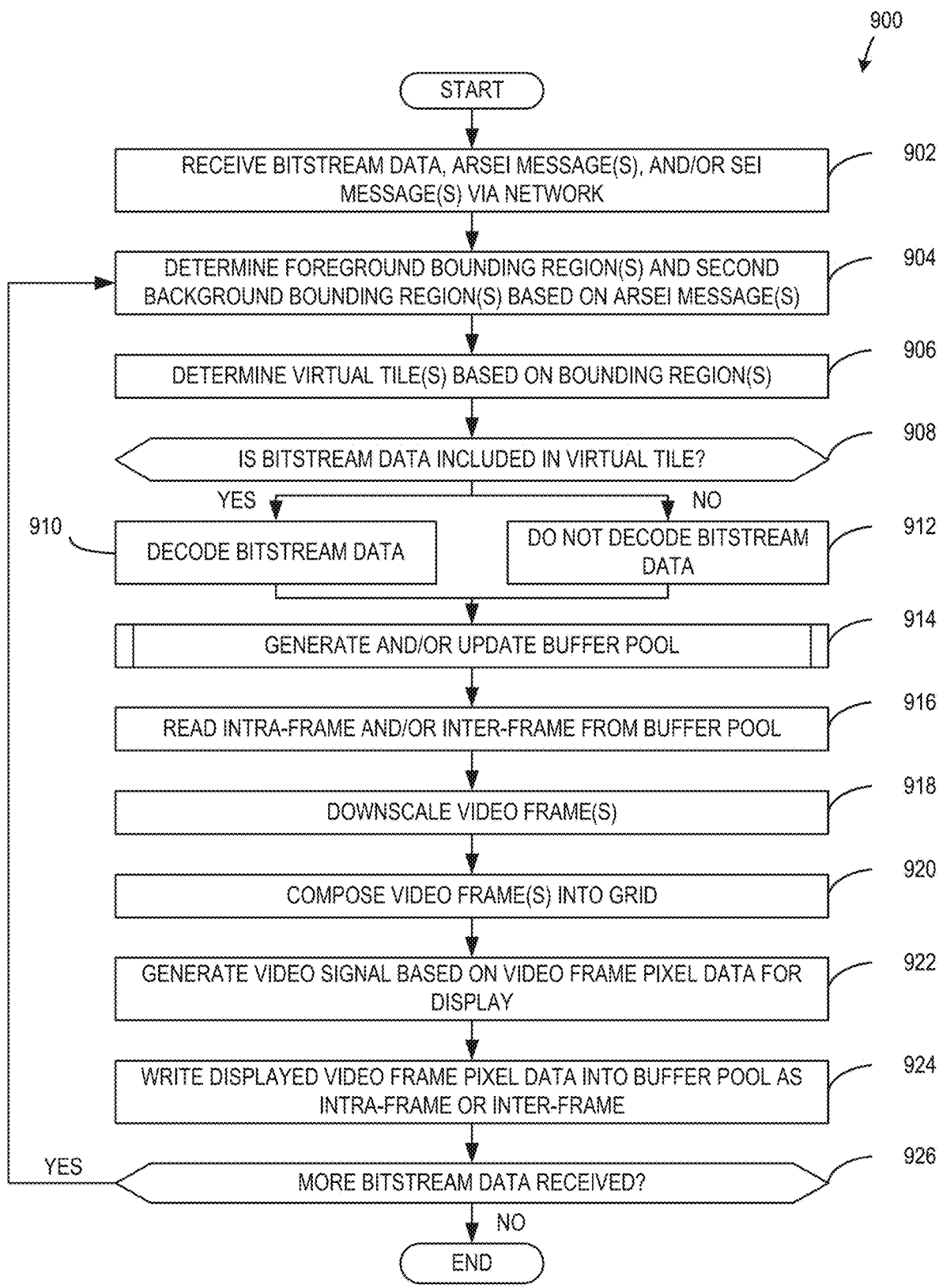
FIG. 9 is a flowchart representative of example machine readable instructions and/or operations that may be executed and/or instantiated by example processor circuitry to implement the video decoder circuitry and the video display controller circuitry of FIGS. 3 and/or 5 to decode, render, and display video frames.
Figure 10:
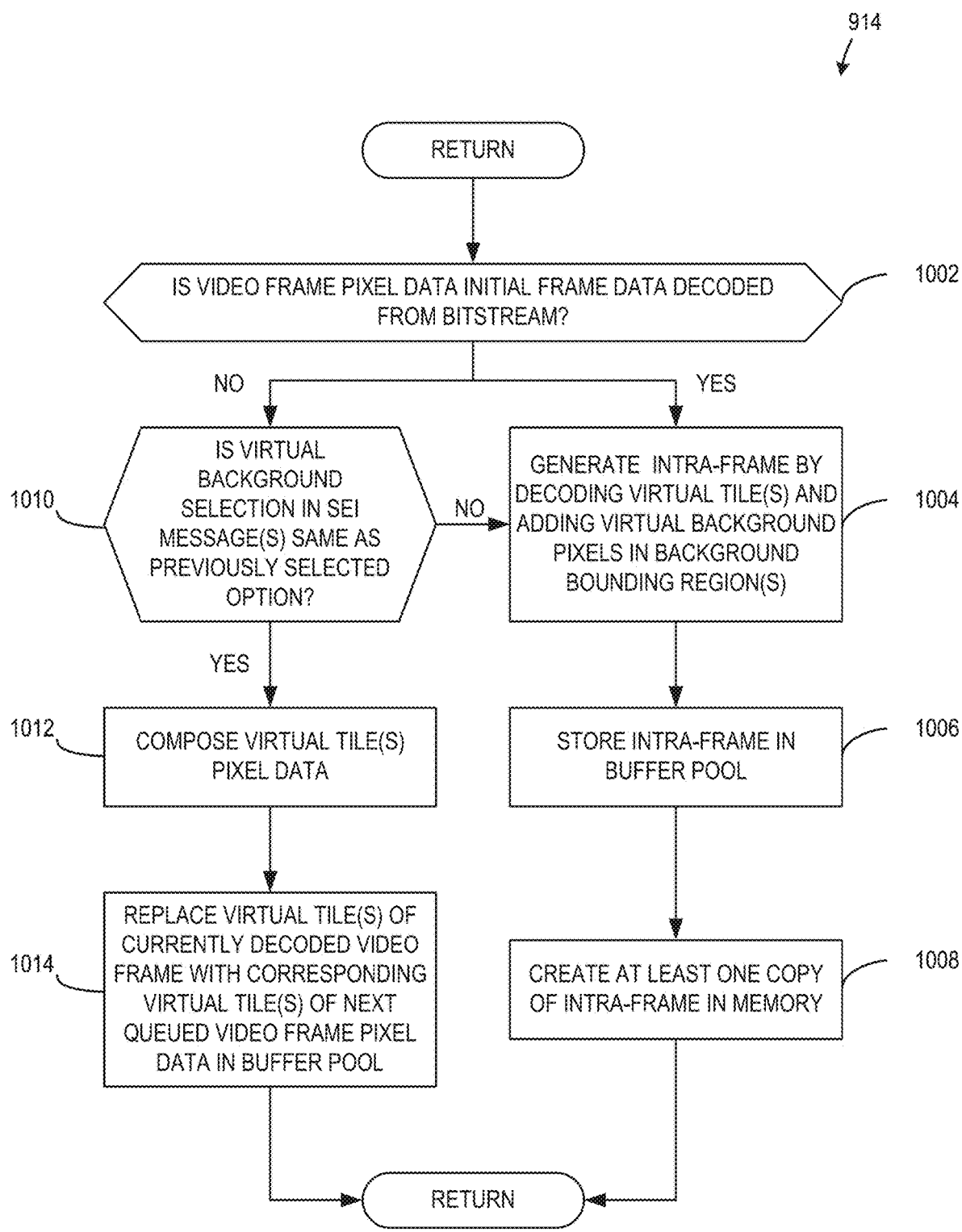
FIG. 10 is a flowchart representative of example machine readable instructions and/or operations that may be executed and/or instantiated by example processor circuitry to implement read and write operations in the buffer pool by the video decoder circuitry and the video display controller circuitry of FIGS. 3, 5, and/or 6 to decode, store, and/or update intra-frame data in the buffer pool.

Flowcharts representative of example hardware logic circuitry, machine readable instructions, hardware implemented state machines, and/or any combination thereof for implementing the user device 302 and/or user device(s) 306 of FIG. 3 are shown in FIGS. 8, 9, and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entirety of the program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 8, 9, and 10, many other methods of implementing the example user device 302 and/or the example user device(s) 306 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8, 9, and 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry of a user device (e.g., the user device 302 of FIGS. 3-5) to determine and encode virtual tile(s) of video frame(s) into bitstream(s) to transmit to one or more other user devices (e.g., the user device(s) 306 of FIGS. 3-5). The machine readable instructions and/or the operations 800 of FIG. 8 begin at block 802, at which the example video preprocessor circuitry 402 (FIG. 4) receives video frame pixel data. For example, the video frame pixel data may be from a video stream generated by the camera(s) 332 of the user device 302.

At block 804, the example video preprocessor circuitry 402 downscales or down-samples (e.g., reduces the resolution of and/or reduces the frame rate of) the received video frame pixel data. For example, the video preprocessing circuitry 402 downscales the video frame pixel data so that further processing and analysis can be performed by other circuitry and/or device(s) on a reduced dataset rather than a full-resolution frame.

At block 806, the example foreground detector circuitry 404 (FIG. 4) implements a first trained neural network to detect pixel data that is in foreground portion(s) (e.g., the rectangular area defining the foreground bounding region 422 of FIG. 4 encompassing the user and some background portion(s)) of the video frame. Also at block 806, the example background detector circuitry 406 (FIG. 4) implements a second trained neural network to detect pixel data that is in the background portion(s) (e.g., background bounding regions 424 of FIG. 4 that include pixels of the video frame that do not include the user) of the video frame.

At block 808, the example segmentation data determiner circuitry 408 generates segmentation data based on foreground portion(s) and background portion(s). For example, the segmentation data corresponds to the pixel data detected in block 806 that is included in the foreground portion(s) (e.g., the foreground bounding region 422) and background portion(s) (e.g., the background bounding regions 424) of the video frame. If pixel data is detected in the foreground portion(s), then the example segmentation data determiner circuitry 408 labels that pixel data as foreground. If pixel data is detected in the background portion(s), then the example segmentation data determiner circuitry 408 labels that pixel data as background. For example, the segmentation data determiner circuitry 408 can label pixel data by storing values (e.g., values representing foreground or background) in association with pixels or groups of pixels represented in the pixel data.

At block 810, the example video encoder circuitry 318 (FIGS. 3 and 4) determines the foreground bounding region(s) and background bounding region(s) of the video frame(s) based on the segmentation data. The foreground bounding region(s) (e.g., the foreground bounding region(s) 422) and background bounding region(s) (e.g., the background bounding regions 424) include one or more rectangular areas of the video frame that are identified by metadata (e.g., the pixel coordinate of the top-left pixel of the region(s), the pixel width and height of the region(s), and the label (foreground or background) of the region(s)).

At block 812, the example video encoder circuitry 318 determines the virtual tile(s) of the video frame pixel data. For example, the video encoder circuitry 318 determines the virtual tile(s) as the collection of pixel data in the video frame(s) that is included in the foreground bounding region(s) but not the background bounding region(s). In other words, the virtual tile(s) are the portion(s) of the video frame in which the background bounding regions 424 do not overlap the foreground bounding region 422.

At block 814, the example video encoder circuitry 318 parses the video frame pixel data to determine whether the pixel data is included in the virtual tile(s). If the pixel data is included in the virtual tile(s), control proceeds to block 816 at which the example video encoder circuitry 318 encodes the pixel data and/or block (e.g., a macroblock, coding tree unit, etc.) of the virtual tile(s) into a video data bitstream. If the pixel data is not included in the virtual tile(s), control proceeds to block 818 at which the example video encoder circuitry 318 skips (e.g., does not encode) the pixel data and writes a motion vector of (0, 0) to annotated regions supplemental enhancement information (ARSEI) message(s) and/or to supplemental enhancement information (SEI) message(s) associated with that pixel and/or block (e.g., macroblock, coding tree unit, etc.) of pixel data.

At block 820, the example video encoder circuitry 318 generates ARSEI message(s) based on bounding region(s). For example, the video encoder circuitry 318 generates the ARSEI message(s) to include metadata (e.g., location, size, and label) of the foreground bounding region(s) (e.g., the foreground bounding region 422) and background bounding region(s) (e.g., the background bounding regions 424) corresponding to the bitstream of encoded frame data.

At block 822, the example video encoder circuitry 318 generates SEI message(s) based on a selected virtual background. For example, the video encoder circuitry 318 generates one or more SEI messages containing label field codes indicating the virtual background template and/or blurred background selected by the transmitting user device (e.g., the user device 302 of FIGS. 3-5).

At block 824, the example video encoder circuitry 318 sends or transmits the bitstream data, ARSEI message(s), and/or the SEI message(s) associated with the video frame pixel data of the video stream to separate user device(s) 306 via the network 304. The example instructions and/or operations of FIG. 8 end.

FIG. 9 is a flowchart representative of example machine readable instructions and/or example operations 900 that may be executed and/or instantiated by processor circuitry of a user device (e.g., the user device 306 of FIGS. 3-5) to determine and decode virtual tile(s) of data bitstream(s) into video frame(s) to display. The machine readable instructions and/or the operations 900 of FIG. 9 begin at block 902, at which the example video decoder circuitry 322 (FIGS. 3 and 5) receives the bitstream data, ARSEI message(s), and/or the SEI message(s) associated with the video frame pixel data of the video stream sent by the user device(s) 302 (FIGS. 3-5).

At block 904, the example video decoder circuitry 322 determines the foreground bounding region(s) and background bounding region(s) of the encoded video frame pixel data based on the received ARSEI messages. For example, video decoder circuitry 322 determines which bitstream data correspond to foreground bounding region(s) (e.g., the foreground bounding region 422 of FIG. 4) and which bitstream data correspond to background bounding region(s) (e.g., the background bounding regions 424 of FIG. 4).

At block 906, the example video decoder circuitry 322 determines the virtual tile(s) of the encoded video frame pixel data based on the foreground bounding region(s) and the background bounding region(s). For example, the video decoder circuitry 322 determines the virtual tile(s) based on portions of the bitstream data corresponding to the foreground bounding region 422 and not the background bounding regions 424.

At block 908, the example video decoder circuitry 322 determines if the received bitstream data is included in the virtual tile(s). In other words, the example video decoder circuitry 322 determines if the encoded pixel data will be located in the virtual tile(s) of the video frame(s) after the bitstream data is decoded. If the example video decoder circuitry 322 determines at block 908 that the bitstream data is included in the virtual tile(s), control proceeds to block 910, at which the video decoder circuitry 322 decodes the bitstream data. If instead the example video decoder circuitry 322 determines at block 908 that the bitstream data is not included in the virtual tile(s), control advances to block 912, at which the video decoder circuitry 322 does not decode the bitstream data.

At block 914, the example video decoder circuitry 322 generates and/or updates a buffer pool 502 of the dynamic random access memory (DRAM) 316 shown in FIG. 5. The example video decoder circuitry 322 generates the buffer pool 502 by decoding intra-frame data (e.g., reference frame data) composed of the initial decoded virtual tile(s) and the selected virtual background template. The example video decoder circuitry 322 stores the intra-frame data in the buffer pool 502 of the DRAM 316 where it gets duplicated, populating the buffer pool. Additionally or alternatively, the example video decoder circuitry 322 replaces the virtual tile(s) of the next queued frame of the buffer pool 502 (e.g., intra-frame data and/or inter-frame data) with the most recently decoded virtual tile(s). Example instructions and/or operations that may be used to implement block 914 are described in greater detail below in connection with FIG. 10.

At block 916, the example video display controller circuitry 324 (FIGS. 3 and 5) reads the intra-frame data and/or the inter-frame data from the buffer pool 502. For example, the video display controller circuitry 324 reads the video frame pixel data from the buffer pool 502 based on the indexed order of the video frame(s) in the video sequence.

At block 918, the example video postprocessor circuitry 504 (FIG. 5) downscales (i.e., reduces the resolution of) the video frame pixel data read from the buffer pool 502. For example, the video postprocessor circuitry 504 downscales the video frame(s) (e.g., video frame 608 of FIG. 6) received from one or more user devices (e.g., user device(s) 302 of FIGS. 3-5) such that a corresponding frame can fit within a grid of frames (e.g., the grid of frames shown as the standard video frame output 702 of FIG. 7) corresponding to the number of user devices connected to the video conferencing application via the network 304 (FIGS. 3-5).

At block 920, the example video postprocessor circuitry 504 composes the downscaled video frame(s) into a grid of video frame pixel data. For example, the video postprocessor circuitry 504 can compose the video frame(s) into a grid (e.g., the grid of frames shown as the standard video frame output 702 of FIG. 7) to be displayed on the display screen 334 (FIGS. 3 and 5). Alternatively, in examples in which only two participants have joined a video conferencing session, the video postprocessor circuitry 504 executes the instructions of block 920 to display a video frame of a participant as a single frame, instead of a multi-frame grid, on the display screen 334.

At block 922, the example video display controller circuitry 324 generates a video signal based on the video frame data read from the buffer pool 502. In this manner, the example video display controller circuitry 324 can send video signal data to the display screen 334 to render the video frame data on the display screen 334.

At block 924, the example video display controller circuitry 324 writes the video frame pixel data back into the buffer pool 502 as intra-frame data or inter-frame data. For example, the video display controller circuitry 324 writes the video frame pixel data in the buffer pool 502 after the video signal is generated for the same pixel data. The instructions or operation of block 924 is used by the display controller circuitry 324 to replenish the buffer pool 502, ensuring that the number of video frames stored in the buffer pool 502 remains consistent during the video conferencing session. For example, if the display controller circuitry 324 did not replenish the buffer pool 502, then the video decoder circuitry 322 would have to wait for the display controller circuitry 324 to render the frame, or the display controller circuitry 324 would have to wait for the video decoder circuitry 322 to decode the frame. By keeping the number of video frames stored in the example buffer pool 502 consistent during the video conferencing session, the time to decode and/or render the video frame is less than the time it would take if the example buffer pool 502 did not maintain a sufficient store of video frame data.

At block 926, the example video decoder circuitry 322 determines if more bitstream data is received from the user device(s) 302 via the network 304. If the video decoder circuitry 322 determines at block 926 that more bitstream data is received, control returns to block 904, at which the video decoder circuitry 322 determines the foreground bounding region(s) and the background bounding region(s) of the encoded frame data based on the ARSEI message(s) also received. If the video decoder circuitry 322 determines at block 926 that no more bitstream data is received, example instructions or operations of FIG. 9 end.

FIG. 10 is a flowchart representative of example machine readable instructions and/or example operations 914 that may be executed and/or instantiated by processor circuitry to generate and/or update the buffer pool 502 (FIGS. 5 and 6) of the DRAM 316 to store a plurality of processed (e.g., decoded) and/or displayed intra-frame data and/or inter-frame data. The machine readable instructions and/or the operations 914 described below may be used to implement block 914 of FIG. 9.

The machine readable instructions and/or the operations 914 of FIG. 10 begin at block 1002 at which the video decoder circuitry 322 (FIGS. 3 and 5) determines if the video frame pixel data corresponds to the first frame decoded from the bitstream data. For example, the video decoder circuitry 322 determines if the video frame pixel data corresponds to the first video frame of the video sequence the transmitting user device(s) 302 capture(s) for the video conference.

If the video decoder circuitry 322 determines, at block 1002, that the video frame pixel data corresponds to the first video frame of a bitstream, control advances to block 1004. At block 1004, the video decoder circuitry 322 generates the intra-frame data. For example, the video decoder circuitry 322 generates the intra-frame data by decoding virtual tile(s) and adding virtual background pixels in background bounding region(s). In some examples, the example video decoder circuitry 322 decodes the virtual tile(s) of the intra-frame data and positions it in front of the virtual background template based on the pixel coordinates included in the ARSEI message(s) corresponding to the virtual tile(s) pixel data.

At block 1006, the example video decoder circuitry 322 stores the constructed intra-frame data in the buffer pool 502. For example, the example video decoder circuitry 322 stores the intra-frame data in the buffer pool 502 as a reference frame to use as a baseline frame for motion estimation of virtual tile pixel data in the inter-frame data.

At block 1008, the example duplicator circuitry 326 (FIGS. 3 and 5) generates a plurality of copies of the intra-frame data to populate the buffer pool 502. The example buffer pool 502 includes a finite number of storage space or capacity that the video decoder circuitry 322 can write to and/or modify and that the video display controller circuitry 324 can read from and/or write to. example video decoder circuitry 322 can modify the stored video frame(s) (e.g., intra-frame data and/or inter-frame data) by replacing the virtual tile(s) of the intra-frame data with the virtual tile(s) of the subsequent decoded video frame (e.g., inter-frame data).

Returning to block 1002, if the video decoder circuitry 322 determines that the video frame pixel data does not correspond to the first video frame of a bitstream, control advances to block 1010. At block 1010, the video decoder circuitry 322 determines whether the virtual background template selection indicated in an SEI message of the bitstream is the same as the virtual background template of the preceding decoded video frame pixel data. If the virtual background template of the currently decoded video frame is not the same as the virtual background template of the preceding decoded video frame, control proceeds to block 1004.

However, if the video decoder circuitry 322 determines, at block 1010, that the virtual background template of the currently decoded video frame is the same as the virtual background template of the preceding decoded video frame, control advances to block 1012 at which the video decoder circuitry 322 composes the virtual tile(s) pixel data in the video frame. For example, the video decoder circuitry 322 composes and arranges the virtual tile(s) pixel data in the video frame in accordance with (e.g., to reconstruct) the captured video.

At block 1014, the example video decoder circuitry 322 replaces the virtual tile(s) of the currently decoded video frame with the virtual tile(s) of the next queued video frame (e.g., intra-frame data and/or inter-frame data) in the buffer pool 502. From a high-level perspective, the example video decoder circuitry 322 removes the virtual tile(s) of the next queued video frame, leaving just the virtual background template, then the video decoder circuitry 322 inserts the current virtual tile(s) composed at block 1012. Since the current virtual tile(s) were composed and positioned properly with respect to the same video frame as the next queued virtual tile(s), there are smooth transitions between the video frames in the buffer pool 502. The example instructions or operations of FIG. 10 end and control returns to a calling function or process such as a function or process implemented by the example instructions or operations of FIG. 9.

Figure 11:
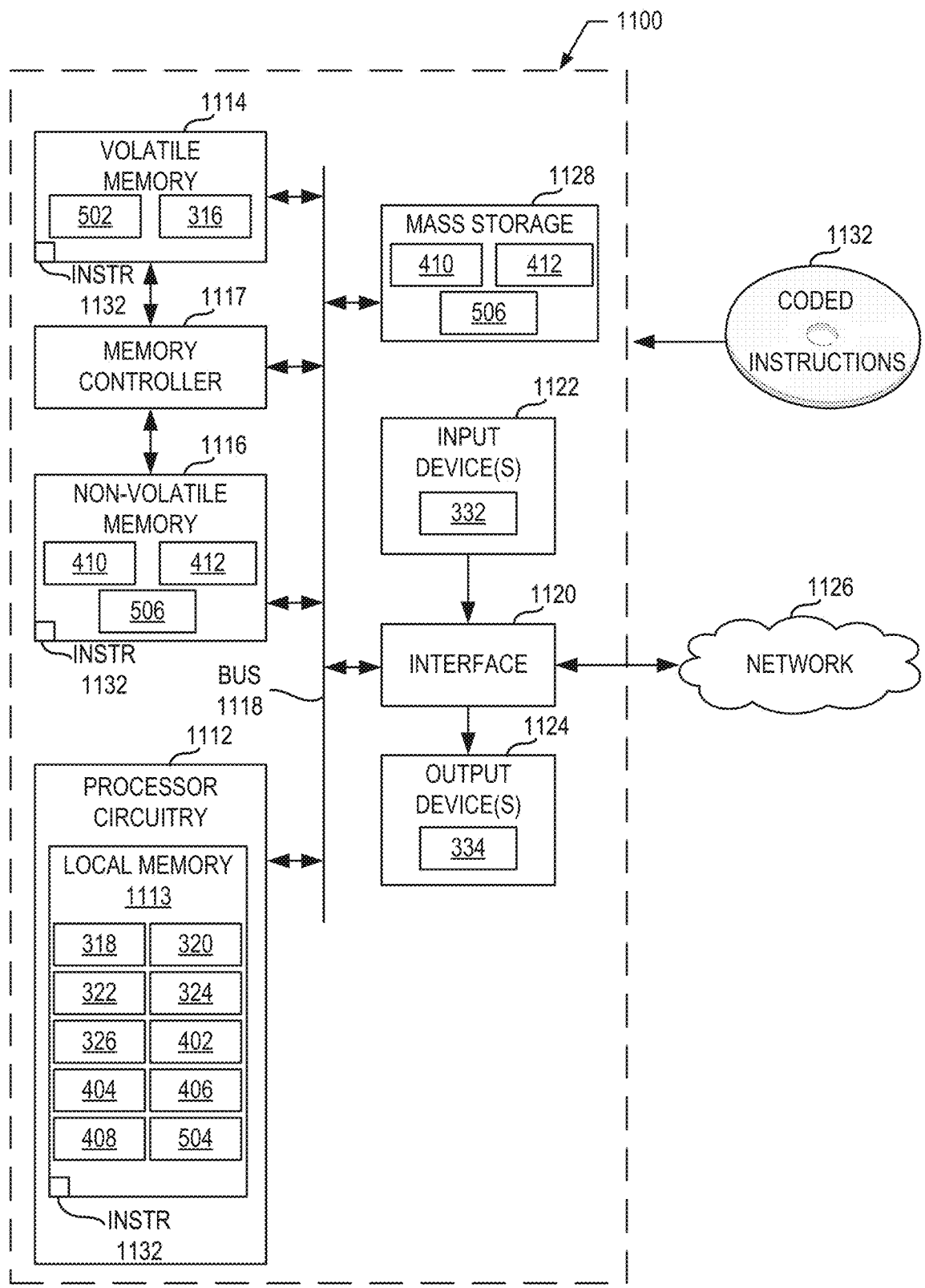
FIG. 11 is a block diagram of an example processing platform including processor circuitry structured to execute the example machine readable instructions of FIGS. 8, 9, and 10 to implement the user device of FIGS. 3-5 to implement artificial intelligence video frame segmentation in accordance with teachings of this disclosure.

FIG. 11 is a block diagram of an example processor platform 1100 structured to execute and/or instantiate the machine readable instructions and/or the operations of FIGS. 8, 9, and 10 to implement the user device 302 and/or user device(s) 306 of FIGS. 3-5. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example video encoder circuitry 318, the example video frame segmenter circuitry 320, the example video decoder circuitry 322, the example video display controller circuitry 324, the example duplicator circuitry 326, the example video preprocessor circuitry 402, the example foreground detector circuitry 404, the example background detector circuitry 406, the example segmentation data determiner circuitry 408, and/or the example video postprocessor circuitry 504.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. In some examples, the volatile memory 1114 may be used to implement the DRAM 316 of FIGS. 3-6 and the example buffer pool 502 of FIGS. 5 and 6. The non-volatile memory 1116 may be implemented by flash memory and/or any other desired type of memory device. In some examples, the non-volatile memory 1116 may be used to implement the models database 410 (FIG. 4), the templates database 412 (FIG. 4), and/or the templates database 506 (FIG. 5). Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, a camera (still or video), a keyboard, a button, a mouse, a touchscreen, a track-pad, a trackball, and/or an isopoint device. In the illustrated example, the input device(s) 1122 implement the camera(s) 332 of FIGS. 3 and 4.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU. In the illustrated example, the output device(s) 1124 implements the display screen 334 of FIGS. 3 and 5.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In some examples, the mass storage devices 1128 may be used to implement the models database 410 (FIG. 4), the templates database 412 (FIG. 4), and/or the templates database 506 (FIG. 5).

The machine executable instructions 1132, which may be implemented by the machine readable instructions of FIGS. 8, 9, and 10, may be stored in the mass storage device 1128, in the volatile memory 1114, in the non-volatile memory 1116, and/or on a removable non-transitory computer readable storage medium such as a CD or DVD.

Figure 12:
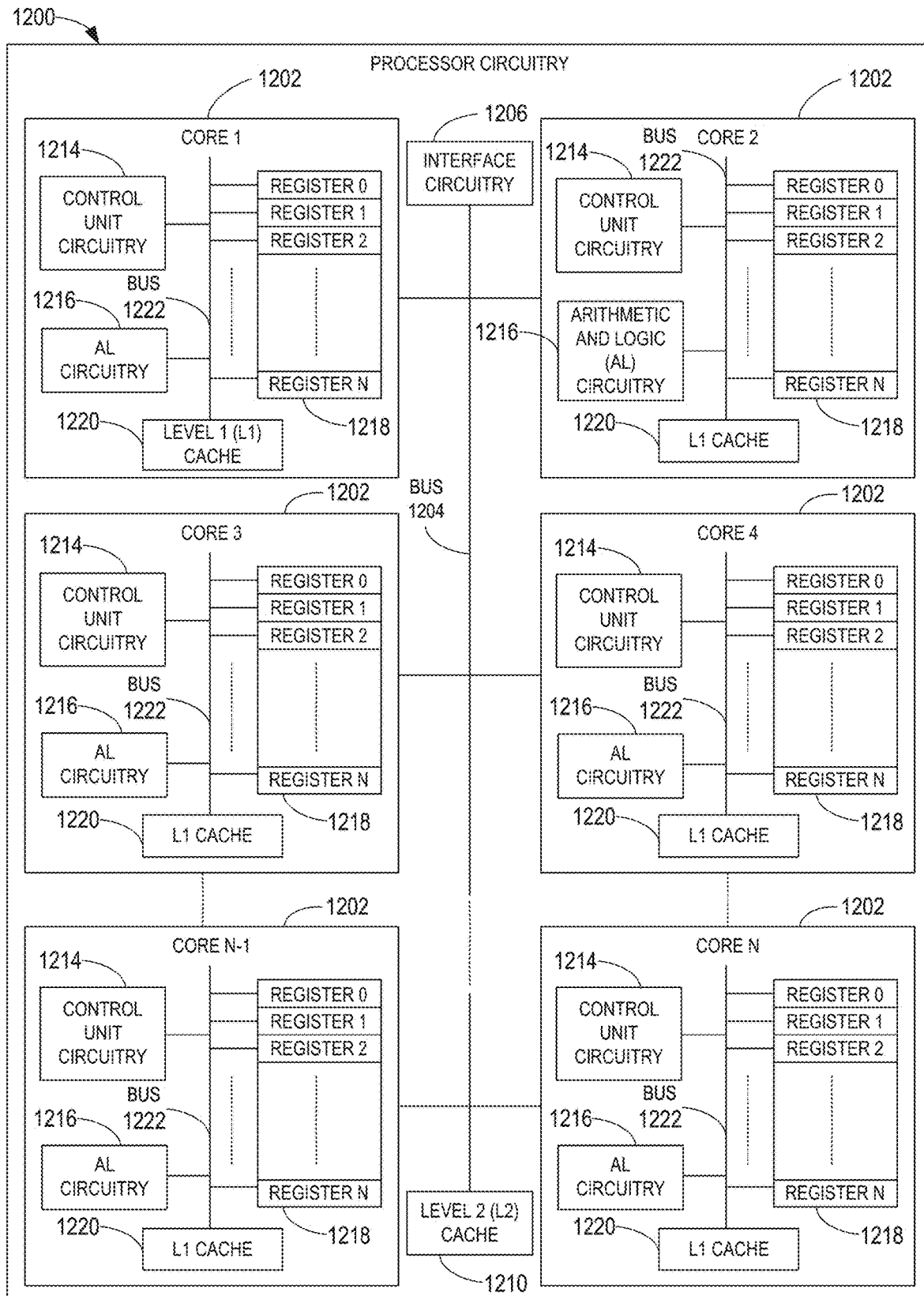
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a general purpose microprocessor 1200. The general purpose microprocessor circuitry 1200 executes some or all of the machine readable instructions of the flowchart of FIGS. 8, 9, and 10 to effectively instantiate the circuitry of FIGS. 3, 4, and 5 as logic circuits to perform the operations corresponding to those machine readable instructions. In some such examples, the circuitry of FIGS. 3, 4, and 5 is instantiated by the hardware circuits of the microprocessor 1200 in combination with the instructions. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 8, 9, and 10.

The cores 1202 may communicate by a first example bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
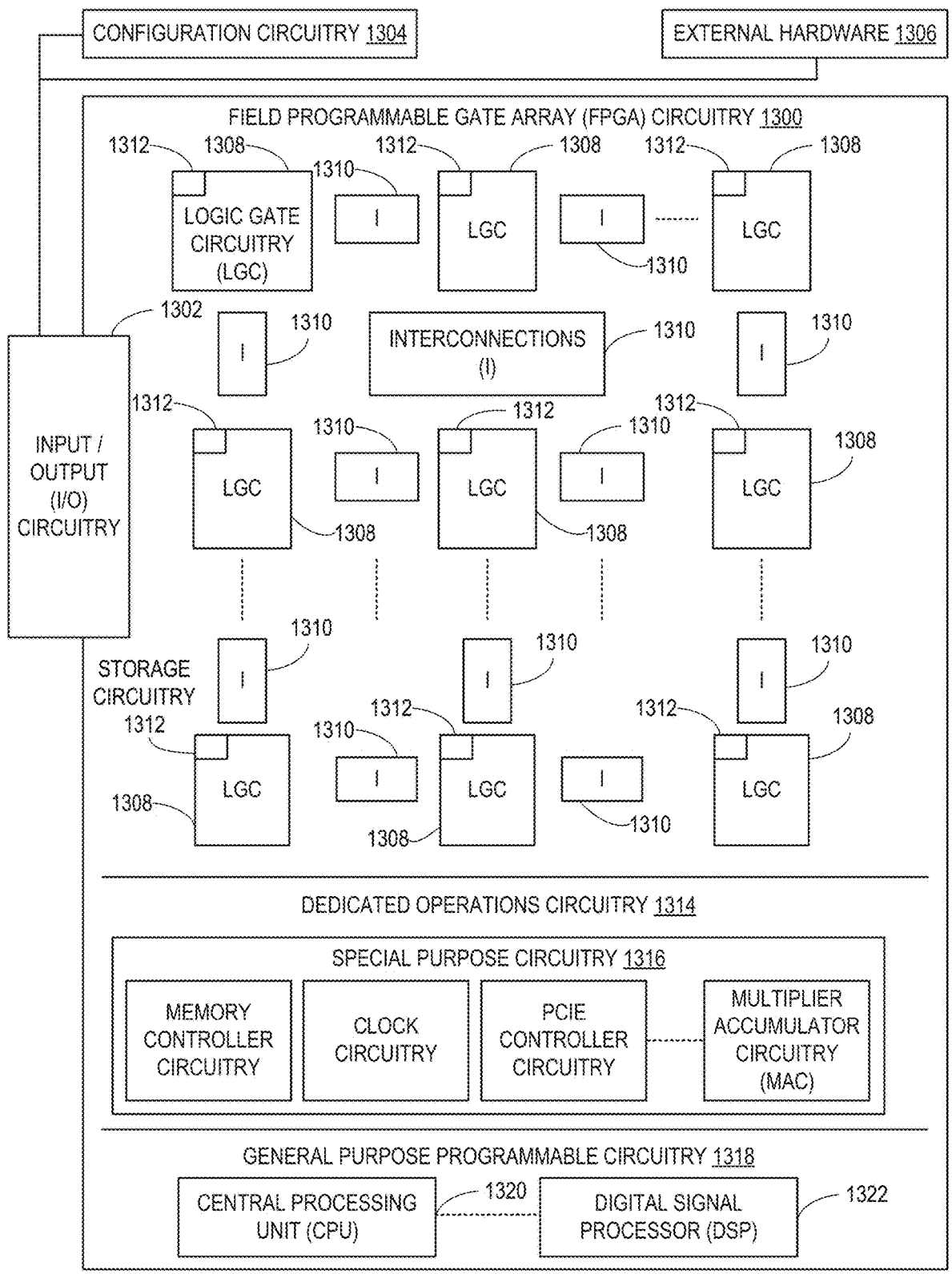
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 13_00 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 8, 9, and 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 8, 9, and 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 8, 9, and 10. As such, the FPGA circuitry 1300 may be structured to effectively instantiate some or all of the machine readable instructions of the flowcharts of FIGS. 8, 9, and 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 8, 9, and 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 8, 9, and 10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 8, 9, and 10 may be executed by one or more of the cores 1202 of FIG. 12, a second portion of the machine readable instructions represented by the flowcharts of FIGS. 8, 9, and 10 may be executed by the FPGA circuitry 1300 of FIG. 13, and/or a third portion of the machine readable instructions represented by the flowcharts of FIGS. 8, 9, and 10 may be executed by an ASIC. It should be understood that some or all of the circuitry of FIGS. 3, 4, and 5 may, thus, be instantiated at the same or different times. Some or all of the circuitry may be instantiated, for example, in one or more threads executing concurrently and/or in series. Moreover, in some examples, some or all of the circuitry of FIGS. 3, 4, and 5 may be implemented within one or more virtual machines and/or containers executing on the microprocessor.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
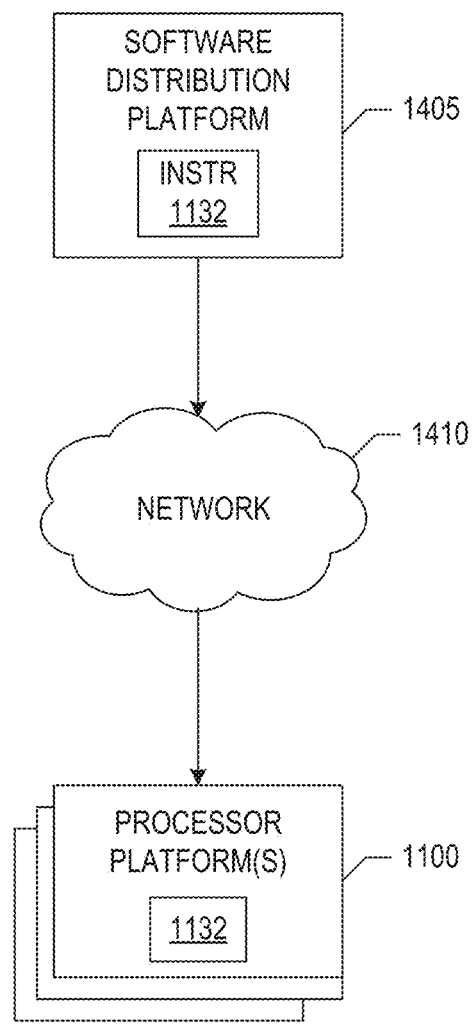
FIG. 14 is a block diagram of an example software distribution platform (e.g., one or more servers) to distribute software (e.g., software corresponding to the example machine readable instructions of FIGS. 8, 9, and/or 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 800, 900, and 914 of FIGS. 8, 9, and 10, as described above. The one or more servers of the example software distribution platform 1405 are in communication with a network 1410, which may correspond to any one or more of the Internet and/or any of the example networks 304 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 800, 900, and 914 of FIGS. 8, 9, and 10, may be downloaded to the example processor platform 1100, which is to execute the machine readable instructions 1132 to implement the user device 302 and/or user device(s) 306 of FIGS. 3, 4, and/or 5. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that segment video frame pixel data generated during video conferencing session(s) into foreground bounding region(s) and background bounding region(s) to determine virtual tile(s) of the video frame pixel data (e.g., portion(s) of video frame pixel data that include subject(s) of the video conferencing session(s)). Disclosed systems, methods, apparatus, and articles of manufacture improve the efficiency of using a computing device by encoding (e.g., processing) the virtual tile(s) on a user device, transmitting (e.g., sending) the encoded virtual tile(s) via a network, and decoding (e.g., processing) the virtual tile(s) on one or more other user devices without processing and/or sending portions of the video frame pixel data that are not included in the virtual tile(s), thereby reducing memory accesses and/or reducing use of processing cycles. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to segment video frame pixel data generated during video conferencing session(s) into foreground bounding region(s) and background bounding region(s), determine virtual tile(s) of the video frame pixel data (e.g., portion(s) of video frame pixel data that include subject(s) of the video conferencing session(s), and process the virtual tile(s) of the video frame pixel data are disclosed herein. Further examples and combinations thereof include the following:

Example 1 includes an apparatus to encode video frame pixel data comprising interface circuitry to encode video frame pixel data, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate video frame segmenter circuitry to generate segmentation data of first video frame pixel data, the segmentation data including metadata corresponding to a foreground region and a background region, the foreground region corresponding to the first video frame pixel data, and video encoder circuitry to generate a first foreground bounding region and a first background bounding region based on the segmentation data, determine a first virtual tile of the first video frame pixel data, the first virtual tile located in the first foreground bounding region, encode the first virtual tile into a video data bitstream without encoding the first background bounding region, and provide the video data bitstream to transmit via a network.

Example 2 includes the apparatus of example 1, wherein the video encoder circuitry is to generate an annotated region supplemental enhancement information message, the annotated region supplemental enhancement information message including at least one of size data, location data, or label data corresponding to the first foreground bounding region and the first background bounding region.

Example 3 includes the apparatus of example 1, wherein the processor circuitry is to perform the at least one of the first operations, the second operations, or the third operations to instantiate video decoder circuitry and video display controller circuitry, the video decoder circuitry to create a second foreground bounding region and a second background bounding region based on an annotated region supplemental enhancement information (ARSEI) message received via the network, determine a second virtual tile of second video frame pixel data, the second virtual tile located in the second foreground bounding region, and decode the second virtual tile, the video display controller circuitry to generate video data corresponding to the second virtual tile and a virtual background, the second virtual tile and the virtual background to be displayed on a screen.

Example 4 includes the apparatus of example 3, wherein the video decoder circuitry is to store the decoded second virtual tile in a buffer pool in a second memory.

Example 5 includes the apparatus of example 1, wherein the video encoder circuitry is to generate an annotated region supplemental enhancement information message, the annotated region supplemental enhancement information message including at least one of size data, location data, or label data corresponding to the first foreground bounding region and a third background bounding region, the third background bounding region corresponding to a portion of the background region overlapping a portion of the foreground region.

Example 6 includes At least one non-transitory computer-readable storage medium comprising instructions that, when executed, cause processor circuitry to at least generate segmentation data of first video frame pixel data, the segmentation data including metadata corresponding to a foreground region and a background region, the foreground region corresponding to the first video frame pixel data, generate a first foreground bounding region and a first background bounding region based on the segmentation data, determine a first virtual tile of the first video frame pixel data, the first virtual tile located in the first foreground bounding region, encode the first virtual tile into a video data bitstream without encoding the first background bounding region, and provide the video data bitstream to transmit via a network.

Example 7 includes the computer-readable storage medium of example 6, wherein the instructions, when executed, cause the processor circuitry to generate an annotated region supplemental enhancement information message, the annotated region supplemental enhancement information message including at least one of size data, location data, or label data corresponding to the first foreground bounding region and the first background bounding region.

Example 8 includes the computer-readable storage medium of example 6, wherein the instructions, when executed, cause the processor circuitry to create a second foreground bounding region and a second background bounding region based on an annotated region supplemental enhancement information (ARSEI) message received from second video encoder circuitry, determine a second virtual tile of second video frame pixel data, the second virtual tile located in the second foreground bounding region, decode the second virtual tile, and generate a video signal corresponding to the second virtual tile and a virtual background, the second virtual tile and the virtual background to be displayed on a screen.

Example 9 includes the computer-readable storage medium of example 8, wherein the instructions, when executed, cause the processor circuitry to store the decoded second virtual tile in a buffer pool in a second memory.

Example 10 includes the computer-readable storage medium of example 6, wherein the instructions, when executed, cause the processor circuitry to generate an annotated region supplemental enhancement information message, the annotated region supplemental enhancement information message including at least one of size data, location data, or label data corresponding to the first foreground bounding region and a third background bounding region, the third background bounding region corresponding to a portion of the background region overlapping a portion of the foreground region.

Example 11 includes an apparatus comprising means for generating segmentation data of first video frame pixel data, the segmentation data including metadata corresponding to a foreground region and a background region, the foreground region corresponding to the first video frame pixel data, and means for encoding a first virtual tile of the first video frame pixel data, wherein the first virtual tile encoding means is to generate a first foreground bounding region and a first background bounding region based on the segmentation data, determine the first virtual tile of the first video frame pixel data, the first virtual tile located in the first foreground bounding region, and encode the first virtual tile into a video data bitstream without encoding the first background bounding region, and means for transmitting the video data bitstream via a network.

Example 12 includes the apparatus of example 11, wherein the first virtual tile encoding means is to generate an annotated region supplemental enhancement information message, the annotated region supplemental enhancement information message including at least one of size data, location data, or label data corresponding to the first foreground bounding region and the first background bounding region.

Example 13 includes the apparatus of example 11, wherein the segmentation data generating means is to create a second foreground bounding region and a second background bounding region based on an annotated region supplemental enhancement information (ARSEI) message received from second video encoder circuitry, determine a second virtual tile of second video frame pixel data, the second virtual tile located in the second foreground bounding region, and decode the second virtual tile, and the apparatus further including means for generating a video signal corresponding to the second virtual tile and a virtual background, the second virtual tile and the virtual background to be displayed on a display screen.

Example 14 includes the apparatus of example 13, wherein the segmentation data generating means is to store the decoded second virtual tile in a buffer pool in a second memory.

Example 15 includes the apparatus of example 11, wherein the first virtual tile encoding means is to generate an annotated region supplemental enhancement information message, the annotated region supplemental enhancement information message including at least one of size data, location data, or label data corresponding to the first foreground bounding region and a third background bounding region, the third background bounding region corresponding to a portion of the background region overlapping a portion of the foreground region.

Example 16 includes a method comprising generating, by executing an instruction with a processor, segmentation data of first video frame pixel data, the segmentation data including metadata corresponding to a foreground region and a background region, the foreground region corresponding to the first video frame pixel data, generating, by executing an instruction with the processor, a first foreground bounding region and a first background bounding region based on the segmentation data, determining, by executing an instruction with the processor, a first virtual tile of the first video frame pixel data, the first virtual tile located in the first foreground bounding region, encoding, by executing an instruction with the processor, the first virtual tile into a video data bitstream without encoding the first background bounding region, and transmitting, by executing an instruction with the processor, the video data bitstream via a network.

Example 17 includes the method of example 16, wherein the generating of the first foreground bounding region and the first background bounding region includes generating an annotated region supplemental enhancement information message, the annotated region supplemental enhancement information message including at least one of size data, location data, or label data corresponding to the first foreground bounding region and the first background bounding region.

Example 18 includes the method of example 16, wherein the generating of the segmentation data of the first video frame pixel data includes creating a second foreground bounding region and a second background bounding region based on an annotated region supplemental enhancement information (ARSEI) message received from second video encoder circuitry, determining a second virtual tile of second video frame pixel data, the second virtual tile located in the second foreground bounding region, decoding the second virtual tile, and generating a video signal corresponding to the second virtual tile and a virtual background, the second virtual tile and the virtual background to be displayed on a display screen.

Example 19 includes the method of example 18, wherein the generating of the segmentation data of the first video frame pixel data includes storing the decoded second virtual tile in a buffer pool in a second memory.

Example 20 includes the method of example 16, wherein the generating of the first foreground bounding region and the first background bounding region includes generating an annotated region supplemental enhancement information message, the annotated region supplemental enhancement information message including at least one of size data, location data, or label data corresponding to the first foreground bounding region and a third background bounding region, the third background bounding region corresponding to a portion of the background region overlapping a portion of the foreground region.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry;
   machine-readable instructions; and
   at least one programmable circuit to be programmed based on the machine-readable instructions to:
   generate a foreground bounding region and a background bounding region based on segmentation data associated with a video frame;
   determine a virtual tile including first pixel data of the video frame, the virtual tile located in the foreground bounding region;
   encode the first pixel data of the virtual tile into a video data bitstream without encoding second pixel data of the background bounding region into the video data bitstream; and
   encode an identifier of a first virtual background of a plurality of virtual backgrounds in a message of the video data bitstream, the first virtual background to replace the background bounding region of the video frame.

2. The apparatus of claim 1, wherein one or more of the at least one programmable circuit is to generate an annotated region supplemental enhancement information message, the annotated region supplemental enhancement information message including at least one of size data, location data, or label data corresponding to the foreground bounding region and the background bounding region.

3. The apparatus of claim 1, wherein the foreground bounding region is a first foreground bounding region, the background bounding region is a first background bounding region, and one or more of the at least one programmable circuit is to:

create a second foreground bounding region and a second background bounding region based on an annotated region supplemental enhancement information message;

determine a second virtual tile including third pixel data, the second virtual tile located in the second foreground bounding region;

decode the second virtual tile; and generate video data corresponding to the second virtual tile and a second virtual background, the second virtual tile and the second virtual background to be displayed on a screen.

4. The apparatus of claim 3, wherein one or more of the at least one programmable circuit is to cause the decoded second virtual tile to be stored in a buffer pool in memory.

5. The apparatus of claim 1, wherein the background bounding region is a first background bounding region, and one or more of the at least one programmable circuit is to generate an annotated region supplemental enhancement information message, the annotated region supplemental enhancement information message including at least one of size data, location data, or label data corresponding to the foreground bounding region and a second background bounding region, the second background bounding region to overlap a portion of the foreground bounding region.

6. At least one non-transitory computer-readable storage medium comprising instructions to cause at least one programmable circuit to at least:

generate a foreground bounding region and a background bounding region based on segmentation data associated with a video frame;

determine a virtual tile including first pixel data of the video frame, the virtual tile in the foreground bounding region;

encode the first pixel data of the virtual tile into a video data bitstream without encoding second pixel data of the background bounding region into the video data bitstream; and encode an identifier of a first virtual background of a plurality of virtual backgrounds in a message of the video data bitstream, the first virtual background to replace the background bounding region of the video frame.

7. The computer-readable storage medium of claim 6, wherein the instructions are to cause one or more of the at least one programmable circuit to generate an annotated region supplemental enhancement information message, the annotated region supplemental enhancement information message including at least one of size data, location data, or label data corresponding to the foreground bounding region and the background bounding region.

8. The computer-readable storage medium of claim 6, wherein the foreground bounding region is a first foreground bounding region, the background bounding region is a first background bounding region, and the instructions are to cause one or more of the at least one programmable circuit to:

create a second foreground bounding region and a second background bounding region based on an annotated region supplemental enhancement information message;

determine a second virtual tile including third pixel data, the second virtual tile located in the second foreground bounding region;

decode the second virtual tile; and generate a video signal corresponding to the second virtual tile and a second virtual background, the second virtual tile and the second virtual background to be displayed on a screen.

9. The computer-readable storage medium of claim 8, wherein the instructions are to cause one or more of the at least one programmable circuit to cause the decoded second virtual tile to be stored in a buffer pool in memory.

10. The computer-readable storage medium of claim 6, wherein the background bounding region is a first background bounding region, and the instructions are to cause one or more of the at least one programmable circuit to generate an annotated region supplemental enhancement information message, the annotated region supplemental enhancement information message including at least one of size data, location data, or label data corresponding to the foreground bounding region and a second background bounding region, the second background bounding region to overlap a portion of the foreground bounding region.

11. An apparatus comprising:

means for generating segmentation data associated with a video frame; and means for encoding a virtual tile of the video frame, the means for encoding to:

generate a foreground bounding region and a background bounding region based on the segmentation data;

determine the virtual tile to include first pixel data of the video frame, the virtual tile located in the foreground bounding region; and encode the first pixel data of the virtual tile into a video data bitstream without encoding second pixel data of the background bounding region into the video data bitstream; and encode an identifier of a first virtual background of a plurality of virtual backgrounds in a message of the video data bitstream, the first virtual background to replace the background bounding region of the video frame.

12. The apparatus of claim 11, wherein the means for encoding is to generate an annotated region supplemental enhancement information message, the annotated region supplemental enhancement information message including at least one of size data, location data, or label data corresponding to the foreground bounding region and the background bounding region.

13. The apparatus of claim 11, including means for generating a video signal, wherein the foreground bounding region is a first foreground bounding region, the background bounding region is a first background bounding region, and:

the means for generating the segmentation data is to:

create a second foreground bounding region and a second background bounding region based on an annotated region supplemental enhancement information message;

determine a second virtual tile including third pixel data, the second virtual tile located in the second foreground bounding region; and decode the second virtual tile; and the means for generating the video signal is to generate the video signal based on the second virtual tile and a second virtual background, the second virtual tile and the second virtual background to be displayed on a display screen.

14. The apparatus of claim 13, wherein the means for generating the segmentation data is to cause the decoded second virtual tile to be stored in a buffer pool in memory.

15. The apparatus of claim 11, wherein the background bounding region is a first background bounding region, and the means for encoding is to generate an annotated region supplemental enhancement information message, the annotated region supplemental enhancement information message including at least one of size data, location data, or label data corresponding to the foreground bounding region and a second background bounding region, the second background bounding region to overlap a portion of the foreground bounding region.

16. A method comprising:
  generating a foreground bounding region and a background bounding region based on segmentation data associated with a video frame;
  determining a virtual tile including first pixel data of the video frame, the virtual tile located in the foreground bounding region;
  encoding the first pixel data of the virtual tile into a video data bitstream without encoding second pixel data of the background bounding region into the video data bitstream; and
  encoding, by at least one programmable circuit based on at least one instruction, an identifier of a first virtual background of a plurality of virtual backgrounds in a message of the video data bitstream, the first virtual background to replace the background bounding region of the video frame.

17. The method of claim 16, wherein the generating of the foreground bounding region and the background bounding region includes generating an annotated region supplemental enhancement information message, the annotated region supplemental enhancement information message including at least one of size data, location data, or label data corresponding to the foreground bounding region and the background bounding region.

18. The method of claim 16, wherein the foreground bounding region is a first foreground bounding region, the background bounding region is a first background bounding region, and including:
  creating a second foreground bounding region and a second background bounding region based on an annotated region supplemental enhancement information message;
  determining a second virtual tile including third pixel data, the second virtual tile located in the second foreground bounding region;
  decoding the second virtual tile; and
  generating a video signal corresponding to the second virtual tile and a second virtual background, the second virtual tile and the second virtual background to be displayed on a display screen.

19. The method of claim 18, including storing the decoded second virtual tile in a buffer pool in memory.

20. The method of claim 16, wherein the background bounding region is a first background bounding region, and including generating an annotated region supplemental enhancement information message, the annotated region supplemental enhancement information message including at least one of size data, location data, or label data corresponding to the foreground bounding region and a second background bounding region, the second background bounding region overlapping a portion of the foreground bounding region.

* * * * *